US009500862B2

(12) United States Patent
Oishi et al.

(10) Patent No.: US 9,500,862 B2
(45) Date of Patent: Nov. 22, 2016

(54) DISPLAY INFORMATION GENERATING APPARATUS, DISPLAY INFORMATION GENERATING METHOD, A PROGRAM FOR DISPLAY INFORMATION GENERATING, AND INFORMATION RECORDING MEDIUM

(75) Inventors: Tomoya Oishi, Fujimino (JP); Tsuyoshi Sakamoto, Fujimino (JP);
(Continued)

(73) Assignee: PIONEER CORPORATION, Kanagawa (JP)

( * ) Notice: Subject to any disclaimer, the term of this patent is extended or adjusted under 35 U.S.C. 154(b) by 86 days.

(21) Appl. No.: 14/384,858

(22) PCT Filed: Mar. 13, 2012

(86) PCT No.: PCT/JP2012/056433
§ 371 (c)(1),
(2), (4) Date: Oct. 27, 2014

(87) PCT Pub. No.: WO2013/136447
PCT Pub. Date: Sep. 19, 2013

(65) Prior Publication Data
US 2015/0293354 A1 Oct. 15, 2015

(51) Int. Cl.
*G02B 27/01* (2006.01)
*G08G 1/095* (2006.01)
*G01C 21/36* (2006.01)

(52) U.S. Cl.
CPC ............ *G02B 27/01* (2013.01); *G01C 21/3635* (2013.01); *G01C 21/3679* (2013.01);
(Continued)

(58) Field of Classification Search
CPC .............. G02B 27/01; G02B 2027/014; G02B 2027/0141; G02B 2027/0198; G08G
(Continued)

(56) References Cited

U.S. PATENT DOCUMENTS 6,011,494 A * 1/2000 Watanabe .......... G01C 21/3635
340/990
8,423,902 B2 * 4/2013 Lin .......................... G09G 5/00
715/790
(Continued)

FOREIGN PATENT DOCUMENTS

EP 1635142 A2 3/2006
EP 2213983 A2 8/2010
(Continued)

OTHER PUBLICATIONS

European Search Report dated Oct. 2, 2015; Application No. 12871188.4.
(Continued)

*Primary Examiner* — Christopher E Leiby
(74) *Attorney, Agent, or Firm* — Young & Thompson

(57) ABSTRACT

Provided is a display information generation apparatus that displays information in a manner so that it becomes possible to immediately and intuitively recognize the information, which is for guiding a mobile body. A navigation apparatus provided with a display that moves together with a vehicle is provided with a display data generation unit that acquires position information indicating the position of the vehicle, acquires, on the basis of the acquired position information, distance information indicating the distance from the position of the vehicle of facilities positioned along the road along which the vehicle is moving, and, on the basis of the acquired position information and distance information, displays an icon indicating the facilities at both sides of the road at the display arranged in order of the order of appearance accompanying the motion of the vehicle.

20 Claims, 19 Drawing Sheets

(75) Inventors: Katsunori Arakawa, Ageo (JP); Seiichi Hasebe, Tsurugashima (JP); Shota Satou, Shiki (JP); Ryuichiro Matsumoto, Akishima (JP); Mineki Miyasaka, Yokohama (JP); Jun Oosugi, Nerima (JP)

(52) U.S. Cl.
CPC ........... *G01C 21/3682* (2013.01); *G08G 1/095* (2013.01); *G02B 2027/014* (2013.01); *G02B 2027/0141* (2013.01); *G02B 2027/0198* (2013.01)

(58) Field of Classification Search
CPC ............. 1/095;G01C 21/3679; G01C 21/3682; G01C 21/3635
See application file for complete search history.

(56) References Cited

U.S. PATENT DOCUMENTS

| | | | |
|---|---|---|---|
| 2002/0130906 A1* | 9/2002 | Miyaki | G01C 21/3664 715/837 |
| 2006/0052934 A1* | 3/2006 | Tomita | G01C 21/3682 701/533 |
| 2006/0155466 A1* | 7/2006 | Kanda | G01C 21/3632 701/420 |
| 2006/0178826 A1 | 8/2006 | Gomi | |
| 2008/0098633 A1* | 5/2008 | Maruyama | G09F 9/37 40/463 |
| 2008/0133579 A1* | 6/2008 | Lim | G06F 17/3087 |
| 2009/0171570 A1* | 7/2009 | Chiba | G01C 21/3682 701/532 |
| 2010/0035637 A1* | 2/2010 | Varanasi | G01C 21/3682 455/457 |
| 2010/0198502 A1 | 8/2010 | Yamazaki | |
| 2011/0047509 A1 | 2/2011 | Arrasvuori | |
| 2011/0161875 A1* | 6/2011 | Kankainen | G06F 3/0481 715/810 |
| 2011/0265023 A1* | 10/2011 | Loomis | G06F 3/04812 715/771 |
| 2012/0179361 A1* | 7/2012 | Mineta | G01C 21/3676 701/410 |
| 2013/0138343 A1* | 5/2013 | Choi | G01C 21/3476 701/527 |

FOREIGN PATENT DOCUMENTS

| | | |
|---|---|---|
| JP | 06-096390 | 4/1994 |
| JP | 08-261780 | 10/1996 |
| JP | 2000-337895 | 12/2000 |
| JP | 2001-343243 | 12/2001 |
| JP | 2002-251432 | 9/2002 |
| JP | 2003-337030 | 11/2003 |
| JP | 2004-132789 | 4/2004 |
| JP | 2005-326209 | 11/2005 |
| JP | 2006-029811 | 2/2006 |
| JP | 2006-214965 | 8/2006 |
| JP | 2006-242810 | 9/2006 |
| JP | 2007-139931 | 6/2007 |
| JP | 2010-175517 | 8/2010 |
| JP | 2011-185909 A | 9/2011 |

OTHER PUBLICATIONS

International Search Report PCT/JP2012/056433 dated Jun. 19, 2012.

Japanese Office Action dated Nov. 24, 2015 in corresponding Japanese Patent Application No. 2014-504537.

* cited by examiner

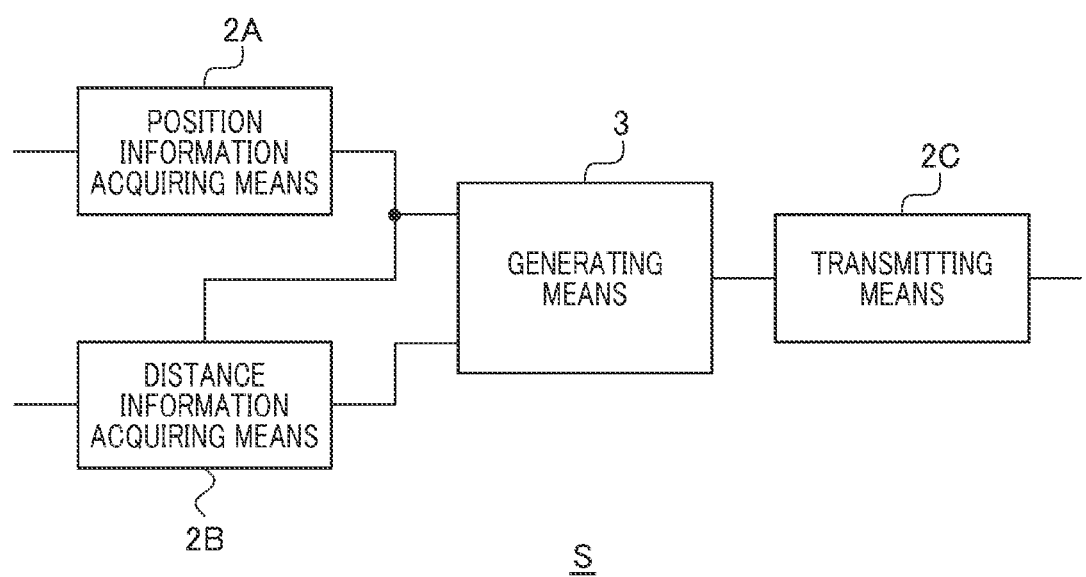

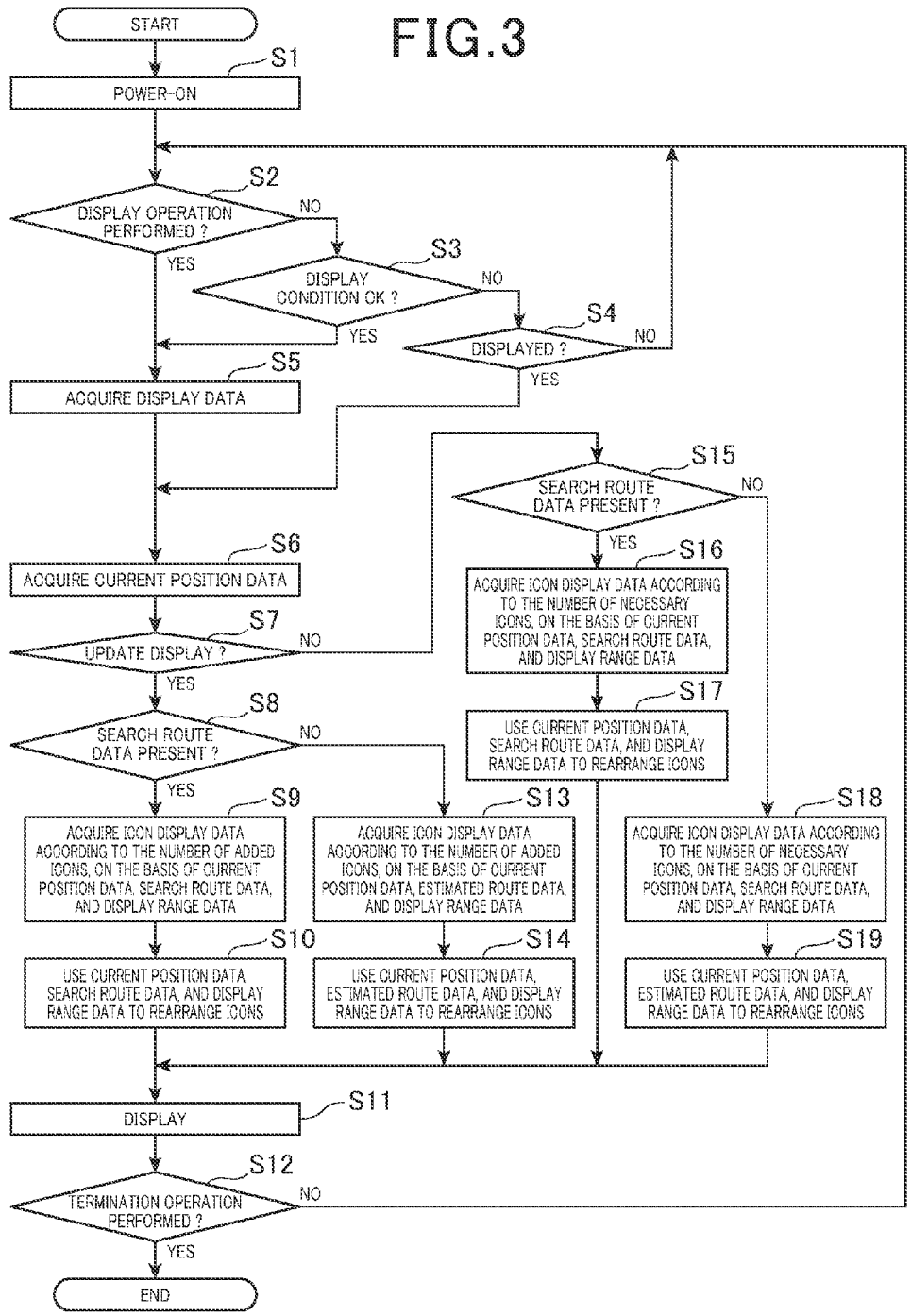

DISPLAY INFORMATION GENERATING APPARATUS, DISPLAY INFORMATION GENERATING METHOD, A PROGRAM FOR DISPLAY INFORMATION GENERATING, AND INFORMATION RECORDING MEDIUM

TECHNICAL FIELD

The present application pertains to a technical field of a display information generating apparatus, a display information generating method, a program for display information generating, and an information recording medium. More specifically, this application pertains to a technical field of: an information generating apparatus and a display information generating method that generate display information to be shown in a movable body such as a vehicle; a program for use in this display information generating apparatus; and an information recording medium that stores this display information generating program.

BACKGROUND ART

Navigation systems that guide the movement of vehicles, bicycles and persons while moving together with them are now in widespread use.

A currently popular navigation system is configured to show a map containing roads on a display at a position of, for example, the dashboard in a vehicle or the like where the driver can view, and guide the driver to a destination by showing a route to the destination on the map. Namely, a conventional navigation system is configured to show a map, and thereby the driver recognizes a route to a destination, an intersection at which the vehicle will make a turn and the like, which are based on a relationship among roads, facilities or the like on the map. For example, Patent Document 1 and Patent Document 2 listed below are cited as prior art documents related to such conventional navigation systems.

In a conventional navigation system as described above, when viewing the display at a position of the dashboard, the driver needs to move his or her line of sight from the front to a position at which the display is viewable. Some people point out a safety problem with regard to this movement of line of sight.

Therefore, in recent years, instead of a display to be provided on a dashboard as described above, navigation systems equipped with a so-called head-up display (referred to below as simply an "HUD") have been developed. Such a navigation system guides the driver by causing the HUD to apply special treatment to a part of the front window which the diver views upon driving and projecting/showing necessary information to or on this part, such as information regarding a right or left turn. Moreover, navigation systems equipped with a so-called head mounted display (referred to below as simply an "HMD") have also been developed. An HMD is embedded in a helmet that the driver wears on his or her head, and shows a map and the like. Navigation systems equipped with such an HUD or an HMD are believed to be appropriate in terms of safety, because drivers no longer need to move their lines of sight from the front in order to visually recognize guide information.

CITATION LIST

Patent Documents

Patent Document 1: JP 2004-132789 A (e.g., FIGS. 3 to 10, etc.)

Patent Document 2: JP H6-96390 A (e.g., FIGS. 3 to 5, etc.)

SUMMARY OF INVENTION

Technical Problem to be Solved by the Invention

In the light of the effect that drivers do not have to move their lines of sight, however, HUDs and HMDs, as described above, are permitted to show guide information within only a limited physical area. Therefore, this means that HUDs and HMDs cannot show so many pieces of information. Furthermore, in particular, when an HUD is used, guide information is shown on the front window through which front scenery is viewed. In this case, the guide information may blend into the front scenery. For this reason, HUDs cannot show complex information.

Then, the most important thing is that when either one of an HUD and HMD is used, the driver needs to recognize both front scenery and guide information simultaneously. Therefore, navigation systems are requested to enable drivers to recognize necessary guide information "intuitively" and "promptly". It should be noted that the concept of "intuitively" and "promptly" is applicable to not only HUD and HMD types but also other currently popular types of navigation systems that show guide information on the display.

Therefore, the present application is made in consideration of the above problems and requests, and its exemplary object is to provide a display information generating apparatus and the like that show information for guiding movable bodies in such a way that it can be recognized more intuitively and promptly.

Solution to the Problem

In order to achieve the above described problems, an invention is a display information generating apparatus that generates display information to be shown in a display means, the display means moving together with a movable body, the display information generating apparatus comprising: a position information acquiring means that acquires position information indicating a position of the movable body; a distance information acquiring means that acquires distance information indicating distances between the position of the movable body and respective terrestrial objects, on the basis of the acquired position information, the terrestrial objects being positioned along a moving path on which the movable body will move; a generating means that generates the display information on the basis of the acquired position information and distance information, the display information being used for showing terrestrial object indices in the display means, the terrestrial object indices indicating the terrestrial objects on both sides of the moving path, the terrestrial object indices being arranged in order in which they appear along with the movement of the movable body; and a transmitting means that transmits the generated display information to the display means, and causes the display means to show the generated display information.

In order to achieve the above described problems, an invention is a display information generating program causing a computer included in the display information generating apparatus to function as: the position information acquiring means; the distance information acquiring means; the generating means; and the transmitting means.

In order to achieve the above described problems, an invention is an information recording medium storing the display information generating program so as to be readable by the computer.

In order to achieve the above described problems, an invention is a display information generating method performed by a display information generating apparatus, the display information generating apparatus generating display information to be shown in a display means, the display means moving together with a movable body, the display information generating method comprising: a position information acquiring step of acquiring position information indicating a position of the movable body; a distance information acquiring step of acquiring distance information indicating distances between the position of the movable body and respective terrestrial objects, on the basis of the acquired position information, the terrestrial objects being positioned along a moving path on which the movable body will move; a generating step of generating the display information on the basis of the acquired position information and distance information, the display information being used for showing terrestrial object indices in the display means, the terrestrial object indices indicating the terrestrial objects on both sides of the moving path, the terrestrial object indices being arranged in order in which they appear along with the movement of the movable body; and a transmitting step of transmitting the generated display information to the display means, and causing the display means to show the generated display information.

BRIEF DESCRIPTION OF THE DRAWINGS

FIG. 1 is a block diagram illustrating a general configuration of a display information generating apparatus in an embodiment.

FIG. 2(a) is this block diagram, FIG. 2(b) illustrates an exemplary configuration of a display database in each example, and FIG. 2(c) illustrates exemplary icons in each example.

FIG. 3 is a flowchart of an icon display process in Example 1.

FIGS. 4(a), 4(b) and 4(c) illustrate first, second and third examples, respectively.

FIGS. 5(a) to 5(d) illustrate first, second, third and fourth examples, respectively.

FIGS. 6(a), 6(b) and 6(c) illustrate fifth, sixth and seventh examples, respectively.

FIGS. 7(a) to 7(h) illustrate first, second, third, fourth, fifth, sixth, seventh and eighth examples, respectively.

FIGS. 8(a) to 8(e) illustrate first, second, third, fourth and eighth examples, respectively.

FIGS. 9(a) and 9(b) illustrate first and second examples, respectively.

FIGS. 10(a), 10(b) and 10(c) illustrate first, second and third examples, respectively.

FIGS. 11(a) and 11(b) illustrate fourth and fifth examples, respectively.

FIGS. 12(a) and 12(b) illustrate first and second examples, respectively.

FIGS. 13(a) to 13(d) illustrate third, fourth, fifth and sixth examples, respectively.

FIG. 15(a) illustrates an exemplary road state as a precondition, and FIG. 15(b) illustrates its first example.

FIGS. 16(a) and 16(b) illustrate second and third examples, respectively.

FIGS. 17(a) to 17(c) illustrate fourth, fifth and sixth examples, respectively.

FIGS. 18(a) and 18(b) illustrate seventh and eighth examples, respectively.

FIG. 19 is a block diagram illustrating a general configuration of a navigation system in a modification and the like.

MODES FOR CARRYING OUT THE INVENTION

Figure 2A:
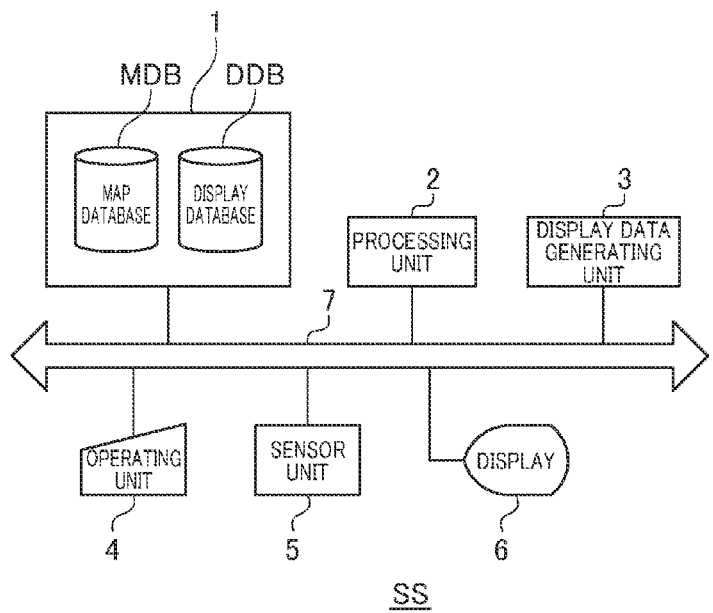
FIGS. 2(a) to 2(c) are block diagrams and the like illustrating a general configuration of a navigation system in Example 1.

Next, an embodiment carrying out the present application will be described with FIG. 1. FIG. 1 is a block diagram illustrating a general configuration of a display information generating apparatus in an embodiment.

A display information generating apparatus in an embodiment is a display information generating apparatus which generates display information to be shown in a display means, such as a liquid crystal display, that moves together with a movable body such as a vehicle, a bicycle or a person. As illustrated in FIG. 1, a display information generating apparatus S in an embodiment consists of a position information acquiring means 2A, a distance information acquiring means 2B, a generating means 3, and a transmitting means 2C.

In the above configuration, the position information acquiring means 2A acquires position information indicating a position of the above movable body, and then outputs it to both of the generating means 3 and the distance information acquiring means 2B. As this position information, for example, position information indicating a position detected in the movable body by a so-called GPS (Global Positioning System) or a position detected autonomously by the movable body itself is acquired.

Then, the distance information acquiring means 2B acquires distance information indicating distances between the position of the movable body and respective terrestrial objects, on the basis of the position information acquired by the position information acquiring means 2A, the terrestrial objects being positioned along a moving path on which the movable body will move. Then, the distance information acquiring means 2B outputs the acquired distance information to the generating means 3. The examples of this terrestrial object include a predetermined facility positioned along the moving path of the movable body, a guide spot for the movement of the movable body, a destination point for this movement. Further, as this distance information, for example, distance information indicating the above distance detected or calculated by an apparatus provided in the movable body is acquired.

Then, the generating means 3 generates display information on the basis of the acquired position information and distance information, and then output it to the transmitting means 2C. The display information is used for showing terrestrial object indices in a display means; the terrestrial object indices indicate the terrestrial objects present on both sides of the moving path; the terrestrial object indices are arranged in order in which they appear along with the movement of the movable body. Then, the transmitting means 2C transmits the transmitted display information to the display means, and causes the display means to show it.

As described above, according to the operation of the display information generating apparatus S in the embodiment, on the basis of the position of the movable body and the distance between this position and each terrestrial object, terrestrial object indices that indicate terrestrial objects present on both sides of a moving path are shown in the display means while being arranged in order in which they appear. Therefore, when a driver views the display means in which the terrestrial object indices are shown, he or she can recognize intuitively and promptly, for example, the presence of terrestrial objects on both sides of a moving path, their positions, and distance senses to the terrestrial objects.

EXAMPLES

Next, a plurality of specific examples according to the embodiment described above will be described with FIGS. 2 (*a*) to 18(*b*). In each example that will be described below, the display information generating apparatus S in the embodiment is applied to a process of generating display information; this display information will be shown on a display included in a navigation system that is mounted in a vehicle to guide its movement. Further, the vehicle is one example of a "movable body" in the present application. Further, a vehicle equipped with a navigation system in each example is referred to below as a "vehicle" as appropriate.

(I) Example 1

First, Example 1 according to the embodiment will be described with FIGS. 2(*a*) to 4(*c*). FIGS. 2(*a*) to 2(*c*) are block diagrams illustrating a general configuration of a navigation system in Example 1, and the like. FIG. 3 is a flowchart of an icon display process in Example 1. FIGS. 4(*a*) to 4(*c*) are exemplary icon displays in Example 1. Here, FIGS. 2(*a*) to 2(*c*) are block diagrams illustrating constituent members that are extracted from the navigation system in Example 1 and associated with the icon display process in Example 1. Further, in FIGS. 2(*a*) to 2(*c*), the same or corresponding member numbers are used for constituent members in each example which correspond to those in the display information generating device s in the embodiment illustrated in FIG. 1.

A navigation system SS in Example 1 which employs the display information generating device S in the embodiment is mounted in the above vehicle, and guides its movement. As illustrated in FIGS. 2(*a*) to 2(*c*), the navigation system SS in Example 1 includes a storage unit 1, a processing unit 2, a display data generating unit 3, an operating unit 4, a sensor unit 5, and a display 6. The storage unit 1 is formed of, for example, a hard disk that stores a map database MDB and a display database DDB in a nonvolatile manner. The display data generating unit 3 is an example of the generating means 3 in the embodiment. The operating unit 4 is formed of, for example, an operating panel or a remote control apparatus that comprises such as a plurality of operating buttons respectively. The sensor unit 5 includes an autonomous position sensor, such as an acceleration sensor or a speed pulse acquiring unit, and such as the above GPS. The display 6 is an example of the "display means" in the present application, and is formed of, for example, a liquid crystal display or an HUD. The processing unit 2 comprises, for example, a non-illustrated CPU, RAM (Random Access Memory) and ROM (Read Only Memory), and configures examples of the position information acquiring means 2A, the distance information acquiring means 2B, and the transmitting means 2C in the embodiment. The above storage unit 1, processing unit 2, display data generating unit 3, operating unit 4, sensor unit 5 and display 6 are interconnected by a bus 7, and can mutually transmit and/or receive data.

In the above configuration, the map database MDB in the storage unit 1 stores, as a database, map data for use in showing a map required to guide the movement of the vehicle in Example 1 on the display 6. On the other hand, the display database DDB stores icon display data 1A, display control data 1B, associated information display data 1C, branch road display data 1E, and road-and-others display data 1D in a nonvolatile manner, as illustrated in FIG. 2(*b*).

Here, the icon display data 1A are used to show, for example, icons IC1 to IC10 as exemplified in FIG. 2(*c*) on the display 6. The icons IC1 to IC10 exemplified in FIG. 2(*c*) are shown on the display 6, for example, at corresponding positions on the display 6, when the positions and the like of facilities (e.g., gas stations "A gasoline" exemplified in the case of FIG. 2(*c*)) (or facilities of a certain type) contained in the map are shown on the display 6. Each of these icons corresponds to an example of the "terrestrial object index" in the present application. In the navigation system SS in Example 1, for example, the display database DDB contained in the storage unit 1 includes the icon display data 1A for use in showing the ten icons IC1 to IC10 having different sizes, as exemplified in FIG. 2(*c*), in relation to one facility (or to one facility type). In the case of the icon display process in Example 1, the individual icons IC1 to IC10 are used to express a distance sense with respect to the current position of the vehicle, as will be described below. More specifically, for example, as a certain facility is positioned closer to the current position, it is shown on the display 6 while being indicated by such as an icon of a larger size. Further, the icon display data 1A are stored in relation to information regarding the attribute of a facility indicated by an icon. Examples of this information include information regarding a category such as a "gas station," a service time, the presence/absence of a parking lot and the like.

Next, the display control data 1B are control data for use in changing the display mode of icons on the display 6 during an icon display process in Example 1 which will be described below. More specifically, the display control data 1B are used to control the change in the display mode, for example, in such a way that the position of an icon shown on the display 6 is displaced vertically and laterally within the display 6 at preset time intervals, the icon is rotated at its display position, or the icon flashes.

Next, the associated information display data 1C are used to show associated information regarding, for example, a facility indicated by each icon shown with the icon display data 1A; the display associated information is shown, for example, at such as a position adjoining to each icon (i.e., at a position corresponding to each icon). More specifically, for example, in the case where the presence of the gas station "A gasoline" is shown on the display 6 by the icon IC1 exemplified in FIG. 2(c), the associated information display data 1C are used to show the gasoline price and the like of this gas station "A gasoline" close to the icon IC1 as the associated information.

Next, the road-and-others display data 1D are used to show roads and the like in Example 1 on the display 6, together with icons shown with the icon display data 1A. More specifically, the road-and-others display data 1D are used to show, on the display 6, for example: a current position mark to be described below which indicates the current position of the vehicle; a road mark to be described below which expresses a road in Example 1; and a distance mark to be described below which indicates a relative distance from the current position, for example, together with the icon IC1 and the like exemplified in FIG. 2(c).

At last, the branch road display data 1E are used to show information regarding a facility and the like present behind the branch on the display 6, when a road on which the vehicle is moving (i.e., will move from the current position) branches off. More specifically, for example, a direction mark to be described below which indicates a divergent direction, and a quantity mark which indicates the number of facilities and the like behind the branch are stored in the storage unit 1 as the branch road display data 1E.

Next, a specific description will be given of an icon display process in Example 1 which is performed mainly by both the processing unit 2 and the display data generating unit 3 in the navigation system SS provided with the configuration exemplified in FIGS. 2(a) to 2(c), with FIGS. 2(a) to 4(c).

First, a specific example and description will be given of the display mode of the icons and the like on the display 6, which is a result of the icon display process in Example 1, with FIG. 4(a).

In the case where the icon display process in Example 1, which will be described below in detail with FIG. 3, is performed, according to one aspect exemplified in FIG. 4(a), the above road mark RM that schematically depicts a road, the above current position mark PM that indicates the current position of the vehicle, the linear above distance marks DL each of which indicates a relative distance from the current position within the road mark RM, and icons 10 to 19 each of which indicates the presence of a facility corresponding to the distance are shown on the display 6.

In this display mode, the current position mark PM, which is a linear mark indicating the current position of the vehicle, is shown so that the current position is positioned at the forefront of the display 6. On the other hand, the road mark RM is shown stereoscopically and schematically, for example, in so-called perspective so that it expresses a road extending from the current position mark PM in the depth direction of the display 6. Here, even if a road on which the vehicle in Example 1 will move in the future is actually curved or has an intersection at which the vehicle should turn right or left, the road mark RM in Example 1 is shown in a linear shape in order to express a "road on which the vehicle should proceed."

Figure 4A:
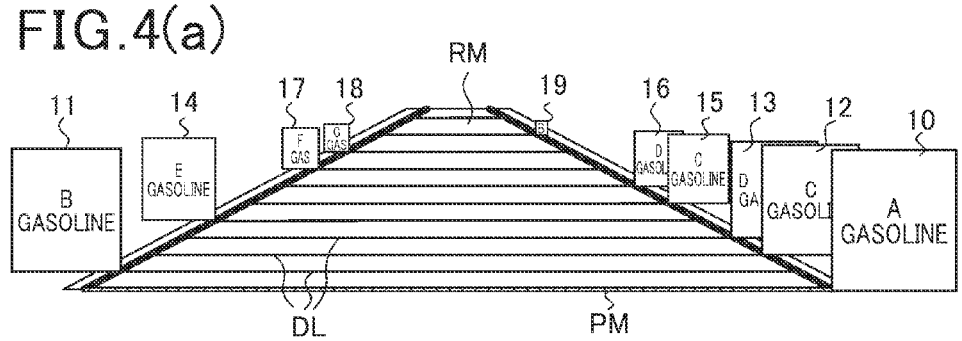
FIGS. 4(a) to 4(c) are exemplary icon displays in Example 1.

Further, the distance marks DL are shown within the road mark RM as straight lines parallel to the current position mark PM, for example, as exemplified in FIG. 4(a). In this way, the distance marks DL express relative distances between the vehicle and facilities (e.g., a plurality of types of gas stations with their presence indicated by the icons 10 to 19 in the example in FIG. 4(a)) to be shown on the display 6 at this moment.

Then, the icons 10 to 19 are shown at positions corresponding to relative distances between the actual positions of facilities with their presence indicated by the icons 10 to 19 and the current position of the vehicle (expressed schematically by the current position mark PM), in order in which these facilities appear when the vehicle moves. Further, each of the icons 10 to 19 is shown on the position of either side of the road mark RM which is related to a side (i.e., right or left side) of the road on which a corresponding facility is actually present when the vehicle will move on the road from the current position in the future.

Further, about the facilities each distance of which from the current position of the vehicle is close to one another, the icons indicating their presence are shown so as to overlap each other, for example, like the icons 10, 12 and 13 exemplified in FIG. 4(a). Further, the icons 10 to 19 are shown side by side so that the facilities with their presence indicated by the icons 10 to 19 are arranged at equal spacings when viewed from the vehicle (actually, they are not arranged at equal spacings though). More specifically, for example, in FIG. 4(a), the icons 10, 11 and 12 are shown so that the difference between the distance from the current position of the vehicle to the gas station "A gasoline" with its presence indicated by the icon 10 and the distance from the current position of the vehicle to the gas station "B gasoline" with its presence indicated by the icon 11 (i.e., the distance between the gas stations "A gasoline" and "B gasoline") is (seemingly) equal to the difference between the distance from the current position of the vehicle to the gas station "B gasoline" and the distance from the current position of the vehicle to the gas station "C gasoline" with its presence indicated by the icon 12 (i.e., the distance between the gas stations "B gasoline" and "C gasoline"). When the display method in this case is more specifically described, there are the following exemplary display methods.

In the case where the icons are shown in perspective as described above, as gas stations are farther away from the current position of the vehicle, the icons indicating their presence are shown on the display 6 while arranged at smaller spacings.

The icon 10 and the like are shown on the display 6 with their sizes expressed in perspective, and the icon 10 and the like are shown on the display 6 while arranged at equal spacings.

The icon 10 and the like are shown on the display 6 without using perspective while arranged at equal spacings.

Figure 2B:
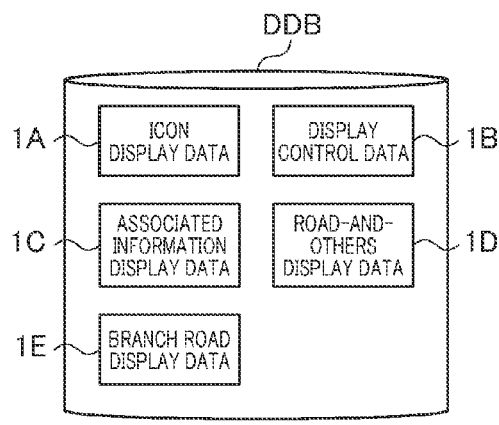
Figure 2C:
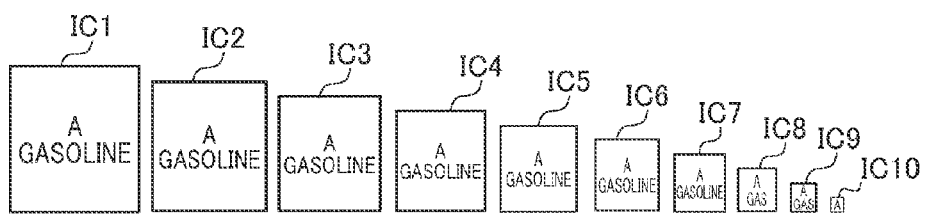

These icons 10 to 19 described above are shown with the icon display data 1A illustrated in FIGS. 2(a) to 2(c). Further, the current position mark PM, the road mark RM and the distance marks DL are shown with the road-and-others display data LD illustrated in FIGS. 2(a) to 2(c).

In the case of the example in FIG. 4(a), specifically, the icon 10 gives the following expression and indication; the gas station "A gasoline" with its presence indicated by the icon 10 is positioned closest to the vehicle at the current position indicated by the current position mark PM; and present on the right side (right sidewalk) of the road (shown schematically by the road marks RM) on which the vehicle will move in the future. Likewise, the icon 11 gives the following indication: the gas station "B gasoline" with its presence indicated by the icon 11 is the second closest to the current position of the vehicle, after the gas station "A gasoline" with its presence indicated by the icon 10; and present on the left side (left sidewalk) of the road shown schematically by the road marks RM. Thereinafter, likewise, the icons 11 to 19 give the following expression and indication in order of increasing distance from the current position of the vehicle. The gas station "C gasoline" with its presence indicated by the icon 12 is positioned on the right side of the road. The gas station "D gasoline" with its presence indicated by the icon 13 is positioned on the right side of the road. The gas station "E gasoline" with its presence indicated by the icon 14 is positioned on the left side of the road. The gas station "C gasoline" with its presence indicated by the icon 15 is positioned on the right side of the road (independently of the gas station "C gasoline" with its presence indicated by the icon 12). The gas station "D gasoline" with its presence indicated by the icon 16 is positioned on the right side of the road (independently of the gas station "D gasoline" with its presence indicated by the icon 13). The gas station "F gasoline" with its presence indicated by the icon 17 is positioned on the left side of the road. The gas station "G gasoline" with its presence indicated by the icon 18 is positioned on the left side of the road. The gas station "B gasoline" with its presence indicated by the icon 19 is positioned on the right side of the road (independently of the gas station "B gasoline" with its presence indicated by the icon 11). As described above, for example, the icons 10 to 12 are shown so that the spacing between the gas stations "A gasoline" with its presence indicated by the icon 10 and "B gasoline" with its presence indicated by the icon 11, respectively, is (seemingly) equal to the spacing between the gas station "B gasoline" and the gas station "C gasoline" with its presence indicated by the icon 12. Further, the distance marks DL in FIG. 4(*a*) may be shown in such a way that as a distance mark DL is shown farther away from the current position of the vehicle, this distance mark DL and its adjacent one are arranged at a shorter spacing (this may also apply to the display of the distance marks DL in the other drawings following FIG. 4(*a*)).

Next, a specific description will be given of the icon display process in Example 1 of showing the icon 10 and the like in the display mode exemplified in FIG. 4(*a*), with FIG. 3. As described above, the icon display process shown in FIG. 3 is performed mainly by the display data generating unit 3, under the control of the processing unit 2. In the following description, the display mode of the icons, as exemplified in FIGS. 4(*a*) to 4(*c*), is referred to as simply an "icon string display".

When the navigation system SS is powered (Step S1), the display data generating unit 3 judges whether or not an operation of creating the icon string display in Example 1 has been carried out in the operating unit 4, during the icon display process in Example 1, as shown in FIG. 3 (Step S2). If the operation has not been carried out in the judgment at Step S2 (Step S2; NO), the display data generating unit 3 then judges whether or not a display condition that has been preset as a start condition for the icon string display is satisfied (Step S3). Namely, the display data generating unit 3 judges whether or not the display condition is satisfied, for example, on the basis of such as: current position data that indicate the current position of the vehicle; vehicle information that indicates the state of the vehicle, the current position data and the vehicle information being acquired by the sensor unit 5; and weather information acquired from a communicating unit that is not illustrated in FIGS. 2(*a*) to 2(*c*) via a network such as the Internet.

Here, the display condition judged at Step S3 is preset display condition for starting the icon string display in Example 1 for which, for example, a time, a place, weather or the above vehicle information is preset as a trigger. Data indicating this display condition is stored in the storage unit 1, for example, in advance. Further, for this display condition, the specific conditions described below are given.

Time condition: when it is judged that a lunch or dinner time has come on the basis of time information counted, for example, by the processing unit 2 (Step S2; YES), the display data generating unit 3 starts the icon string display by using icons indicating the presence of facilities of, for example, such as restaurants or cafes.

Position condition: when it is judged that the vehicle has entered a predetermined local area on the basis of the current position data (Step S2; YES), the display data generating unit 3 automatically (i.e., in the Push mode) starts the icon string display by using icons indicating the presence of facilities of, for example, such as stores in this local area.

Weather condition: for example, when it is judged that a time zone in which snow is predicted to fall heavily has come or the vehicle enters a place where snow is predicted to fall heavily, on the basis of the above weather information (Step S2; YES), the display data generating unit 3 starts the icon string display by using icons indicating the presence of facilities of, for example, stores at the roadside in order to prepare for a situation in which these facilities are not viewed.

Vehicular condition: for example, when it is judged that the gasoline (internal-combustion engine type) or the battery remaining amount (EV type) of the vehicle is decreased to a predetermined amount or the below (Step S2; YES), the display data generating unit 3 starts the icon string display by using icons indicating the presence of facilities of, for example, of gas stations or plug-in stations.

If the display condition described above is not satisfied in the judgment at Step S3 (Step S3; NO), the display data generating unit 3 then judges whether or not the icon string display in Example 1 has already been created on the display 6 (Step S4). If the icon string display has not yet been created in the judgment at Step S4 (Step S4; NO), the display data generating unit 3 returns to the judgment at Step S2, and waits for an operation of creating the icon string display.

On the other hand, if it is judged that the operation of creating the icon string display has been carried out in the judgment at Step S2 (Step S2; YES) or that the display condition is satisfied in the judgment at Step S3 (Step S3; YES), the display data generating unit 3 then acquires display data for use in creating the icon string display on the display 6 mainly from the storage unit 1, the sensor unit 5 or the like (Step S5). Here, in the case of the icon string display in Example 1, examples of the display data acquired at Step S5 include such as: search route data indicating a search route to a destination having been searched for on the basis of the setting by the user of the navigation system SS; and display range data indicating a preset display range that indicates whether to display target facilities of how far away from the current position of the vehicle, the display target facilities being the display target in the icon string in Example 1. Further, if the search route has not been searched for because a destination was not set, for example, estimated route data that indicate a route continuing along the road on which the vehicle is currently moving are acquired at Step S5. Among these types of data, the search route data, the display range data and the estimated route data respectively are acquired by the processing unit 2, and are, for example, data that have been searched for by the processing unit 2 during a search process, or data that have been set in the past and are stored in the storage unit 1.

In the case where the display data have been acquired at Step S5 or in the case where the icon string display has already been created in the judgment at Step S4 (Step S4; YES), the display data generating unit 3 then acquires current position data that indicate the current position of the vehicle from the sensor unit 5 (Step S6). Subsequently, the display data generating unit 3 judges whether or not it starts a new icon string display in Example 1 on the display 6 or updates the already created icon string display in accordance with the travel of the vehicle (Step S7). In the judgment at Step S7, whether or not the already created icon string display is updated is judged on the basis of, for example, whether or not the movement of the vehicle to the actual position of a facility expressed by the forefront icon in the currently created icon string display is detected, for example, through the current position data output from the sensor unit 5.

In the case where it is judged that the icon string display will be updated in the judgment at Step S7 (Step S7; YES), the display data generating unit 3 then judges whether or not the above search route data are present (Step S8). In the case where the above search route data are present in the judgment at Step S8 (Step S8; YES), the display data generating unit 3 then acquires the above icon display data 1A according to the number of new added icons as the update of the icon string display (see above Step S7; YES), on the basis of the current position data acquired during the process at above Step S6 and both the search route data and the display range data acquired during the process at above Step S5 (Step S9). In this case, when a category (e.g., "gas station") of facilities to be shown is designated in advance, the display data generating unit 3 acquires the icon display data 1A for use in showing icons falling into this category. After that, the display data generating unit 3 uses the acquired icon display data 1A to rearrange the icons for the icon string display, for example, within not-illustrated video RAM in the display data generating unit 3, on the basis of the above current position data, the search route data, and the display range data (Step S10). In the process at Step S10, for example, the sizes of icons to be shown, the position of each icon with respect to the icon road mark RM (which side of the icon road mark RM each icon is placed on), and the overlapping of icons indicating the presence of facilities positioned close to one another by a distance (see FIG. 4(*a*)) are determined on the basis of the distance between each display target facility and the current position of the vehicle and a side of a road, the vehicle will move on in the future, on which each facility is present. Then, the icons are rearranged. After that, the display data generating unit 3 updates the icon string display by actually showing the rearranged icons on the display 6 (Step S11).

After that, the display data generating unit 3 checks whether or not an operation of terminating the icon string display has been carried out in the operating unit 4 (Step S12). In the case were this operation has been carried out (Step S12; YES), the display data generating unit 3 terminates the icon display process in Example 1, and transits to the display of, for example, such as a normal guide map. On the other hand, in the case where the operation has not been performed in the judgment at Step 312 (Step S12; NO), the display data generating unit 3 returns to the judgment at Step S2, and then starts a new icon display process.

On the other hand, in the case where the above search route data are absent in the judgment at above Step S8 (Step S8; NO), the display data generating unit 3 acquires the above icon display data 1A according to the number of new added icons as the update of the icon string display (see above Step S7; YES), on the basis of the current position data acquired during the process at above Step S6 and both the estimated route data and the display range data acquired during the process at above Step S5 (Step S13). After that, the display data generating unit 3 uses the acquired icon display data 1A to rearrange the icons for the icon string display, for example, on the video RAM through the same process as at Step S10, on the basis of the above current position data, the estimated route data, and the display range data (Step S14). After that, the display data generating unit 3 transits to the process at above Step S11 and the next process at above Step S12.

On the other hand, in the case where it is judged that the icon string display will not be updated but a new icon string display will be initiated in the judgment at Step S7 (Step S7; NO), the display data generating unit 3 then judges whether or not the above search route data are present (Step S15). In the case where it is judged that the above search route data are present in the judgment at Step S15 (Step S15; YES), the display data generating unit 3 acquires the above icon display data 1A according to the number of icons contained in the new icon string display (see Step S7; NO), on the basis of the current position data acquired during the process at above Step S6 and both the search route data and the display range data acquired during the process at above Step S5 (Step S16). In this case, in the case where a category of facilities to be shown is designated in advance, the display data generating unit 3 acquires the icon display data 1A for use in showing icons falling into this category. After that, the display data generating unit 3 uses the acquired icon display data 1A to arrange the icons for the new icon string display, for example, on the above video RAM, on the basis of the current position data, the search route data and the display range data (Step S17). Further, in this process at Step S17, similar to the process at Step S10 described above, for example, the sizes of icons to be shown, the position of each icon with respect to the icon road mark RM, and the overlapping of icons indicating the presence of facilities positioned close to one another by a distance (see FIG. 4(*a*)) are determined on the basis of the distance between each display target facility and the current position of the vehicle and a side of a road, the vehicle will move on in the future, on which each facility is present. Then, the icons are newly arranged. After that, the display data generating unit 3 transits to the process at above Step S11 and the next process at above Step S12.

Further, in the case where it is judged that the above search route data are absent in the judgment at Step S15 (Step S15; NO), the display data generating unit 3 acquires the above icon display data 1A according to the number of icons contained in the new icon string display (see Step S7; NO) through the same process as at Step S16, on the basis of the current position data acquired during the process at above Step S6 and both the estimated route data and the display range data acquired during the process at above Step S5 (Step S18). After that, the display data generating unit 3 uses the acquired icon display data 1A to arrange the icons for the new icon string display, for example, on the above video RAM as in the process at Step S17, on the basis of the current position data, the estimated route data and the display range data (Step S19). Then, the display data generating unit 3 transits to the process at above Step S11 and the next process at above Step S12.

The icon display process that has been described above with FIG. 3 is repeated until an operation of terminating this process is carried out in the operating unit 4 (see Step S12; YES). As a result, the icon string display exemplified in FIG. 4(a) is created so that shown icons are updated successively along with the movement of the vehicle.

Figure 4B:
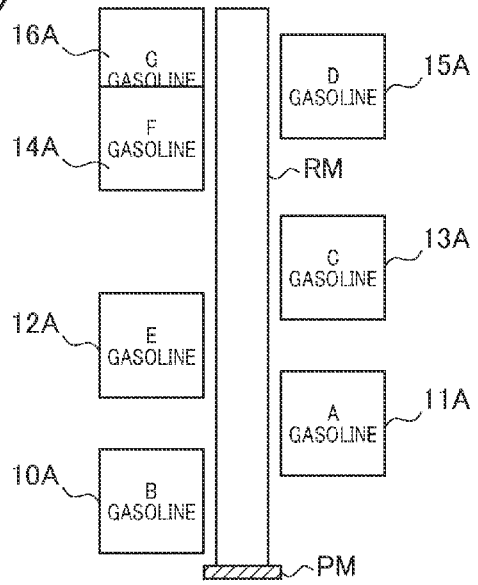
Figure 4C:
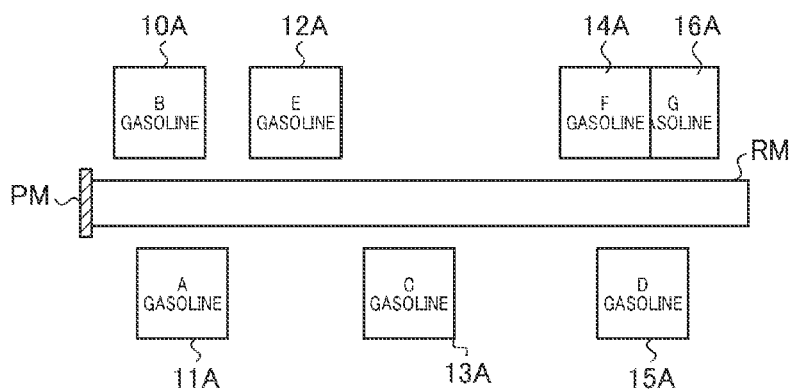

Further, the icon string display in Example 1 can be, for example, a planar one exemplified in FIG. 4(b) (vertical arrangement) or FIG. 4(c) (lateral arrangement), instead of the stereoscopic one exemplified in FIG. 4(a). In such cases, the facilities with their presence indicated by icons 10A to 16A are shown on the both sides (the right and left sides in the example of FIG. 4(b) or the upper and lower sides in the example of FIG. 4(c)) of a road mark RM with one end having a current position mark PM. Then, the icons 10A to 16A are shown at positions corresponding to the distances between the respective positions of these facilities and the current position of the vehicle.

Specifically, the icon 10A gives the following expression and indication: the gas station "B gasoline" with its presence indicated by the icon 10A is present closest to the current position of the vehicle and on the left side (left sidewalk) of the road shown schematically by the road marks RM. Likewise, icons 11A to 16A give the following expression and indication in order of increasing distance from the current position of the vehicle. The gas station "A gasoline" with its presence indicated by the icon 11A is positioned on the right side of the road. The gas station "E gasoline" with its presence indicated by the icon 12A is positioned on the left side of the road. The gas station "C gasoline" with its presence indicated by the icon 13A is positioned on the right side of the road. The gas station "F gasoline" with its presence indicated by the icon 14A is positioned on the left side of the road. The gas station "D gasoline" with its presence indicated by the icon 15A is positioned on the right side of the road. The gas station "G gasoline" with its presence indicated by the icon 16A is positioned on the left side of the road. An updated or new icon string display exemplified in FIG. 4(b) or 4(c) is shown in the same manner as in the icon string display exemplified in FIG. 4(a), through the same process as that using the display data generating unit 3 described with FIG. 3.

As described above, the icon display process performed by the navigation system SS in Example 1 shows, on the display 6, icons including such as the icon 20 that indicate facilities present on both sides of a road in order in which they appear, on the basis of the current position of a vehicle and the distance between this current position and a desired facility. This makes it possible to recognize intuitively and promptly facilities present on the both sides of a road.

Icons including such as the icon 10 are arranged in order in which they appear along with the movement of the vehicle, and each of these icons is shown on the display 6 at a position corresponding to a side of a road on which a facility indicated thereby is present. This makes it possible to recognize more intuitively and promptly terrestrial objects present on the both sides of a road.

Icons including such as the icon 10 are arranged in order in which they appear along with the movement of a vehicle, and shown in perspective with respect to the position of the vehicle. This perspective display makes it possible to recognize facilities and the like more intuitively and promptly.

By not showing information itself regarding the distance to facilities, the entire display on the display 6 can be simplified. This makes it possible to recognize facilities and the like more intuitively and promptly.

Since the road mark RM depicting a road is indicated by a straight line, regardless of such as a curved state of the road, it possible to recognize more intuitively and promptly such as the relationships of individual icons including the icon 10 to a road on which a vehicle will move in the future.

Furthermore, in the case where at least two of a plurality of icons including such as the icon 10 overlap each other on the display 6, the plurality of icons including such as the icon 10 are shown while being shifted from one another. It is thus possible to show facilities and the like with their presence indicated by the icons including such as the icon so as to prevent them from being overlooked.

The plurality of icons including such as the icon 10 that indicates facilities present on both sides of a road are shown on the display 6 while being arranged in order in which they appear when a vehicle moves and in such a way that the facilities are positioned at equal spacings when viewed from the vehicle. The fore-and-aft position relation of the facilities when viewed at the position of the vehicle is thereby clarified. This makes it possible to recognize, for example, such as the relationship among the facilities more intuitively and promptly. According to the case of the display method in Example 1, there may be cases where the distant relationship of a vehicle to icons including such as the icon 10 that indicate the presence of stores, etc. positioned on both sides of a road differs from the accrual one. However, this difference may not exert a substantially great influence upon users, especially in the case where the display is created in perspective as described above. Further, within urban areas, in many cases, stores and the like on one side of each road do not greatly differ in number from those on the other side. Therefore, no practical problems may occur. In contrast to this, with the display method in Example 1, many facilities such as stores can be shown, because icons including such as the icon 10 can be shown at decreased spacings. In the case where a user feels like being unable to enter a store easily on the opposite lane side or not entering it, he or she can efficiently refer to only information regarding appearance order of stores and the like on the driving lane side.

Further, in the case of using an HUD as the display 6 enables facilities to be recognized more intuitively and promptly without involving the displacement of a driver's line of sight.

(II) Example 2

Next, a description will be given of Example 2 that is another example according to the embodiment, with FIGS. 5(a) to 6(c). FIGS. 5(a) to 6(c) are exemplary icon displays in Example 2.

Further, a hardware configuration in a navigation system in Example 2 and a process of an icon string display in Example 2 are basically the same as the hardware configuration of the navigation system SS in Example 1 and the process described with FIG. 3, respectively. In FIGS. 5(a) to 6(c), accordingly, the same reference numerals are assigned to the same components as those in the navigation system SS in Example 1 (see FIGS. 2(a) to 2(c)) and the icon string display (see FIGS. 4(a) to 4(c)), and details thereof will not be described.

In Example 1 described above, the icon string display has been described regarding the case where display target facilities are present at different distances from the current position of the vehicle. In contrast to this, in Example 2 that will be described below, the present application is applied to an icon string display to be created when a plurality of facilities are present at substantially the same distance from the current position of a vehicle, more specifically, for example, when a plurality of facilities that fall into the category of a display target are present in a single building.

Figure 5A:
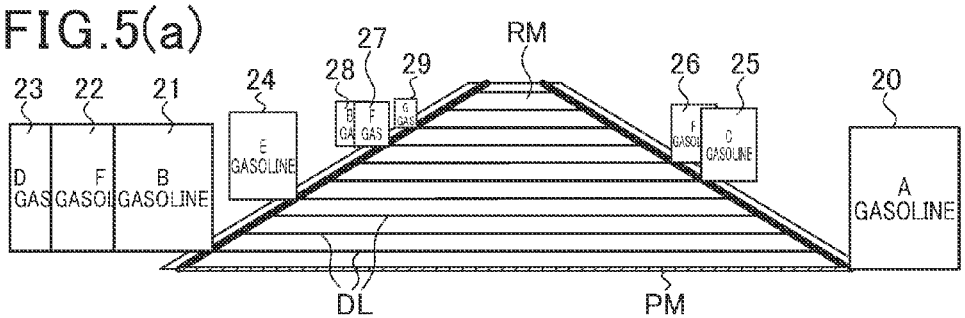
FIGS. 5(a) to 5(d) are exemplary icon displays (I) in Example 2.

According to one aspect exemplified in FIG. 5(a), specifically, in the case where an icon display process in Example 2 is performed, a road mark RM, a current position mark PM, and distance marks DL that are the same as those in Example 1 (see FIGS. 4(a) to 4(c)) and icons 20 to 29 that indicate the presence of facilities corresponding to individual distances from the current position of a vehicle are shown on a display 6.

Here, in the case of the example in FIG. 5(a), gas stations "B gasoline," "F gasoline" and "D gasoline" with their presence indicated by the icons 21, 22 and 23 are placed on the first, second and third floors, respectively, in a single building. Therefore, those gas stations are placed at substantially the Same distance from the current position of the vehicle. Further likewise, gas stations "F gasoline" and "B gasoline" with their presence indicated by icons 27 and 28 are positioned on the first and second floors, respectively, in another single building. Therefore, those gas stations are also positioned at substantially the same distance from the current position of the vehicle. In this case, the display data generating unit 3 acquires icon display data 1A regarding the icons 21 to 23 as an icon display process in Example 2, in order to show them in an overlapping fashion at a position corresponding to the same distance from the current position indicated by the current position mark PM (see Step S9, S13, S16 or S18 in FIG. 3). Then, the display data generating unit 3 uses the acquired icon display data 1A to show the icons 21 to 23 on the display 6, as exemplified in FIG. 5(a) (see Steps S10, S14, S17 or S19 and S11 in FIG. 3). Further likewise, the display data generating unit 3 acquires the icon display data 1A regarding the icons 27 and 28, in order to show them in an overlapping fashion at a position corresponding to the same distance from the current position indicated by the current position marks PM. Then, the display data generating unit 3 uses the acquired icon display data 1A to show the icons 27 and 28 on the display 6, as exemplified in FIG. 5(a) (see Steps S11 in FIG. 3). Further, in showing icons in an overlapping fashion with the display data generating unit 3, for example, icons 21 and 27 that indicate the presence of the gas station on the first floor is shown at the forefront, and icons 22 and 23 or 28 that indicate presence of the gas stations on the upper floors are shown so as to be hidden sequentially behind in order of the increasing floor on which they are placed.

Figure 5B:
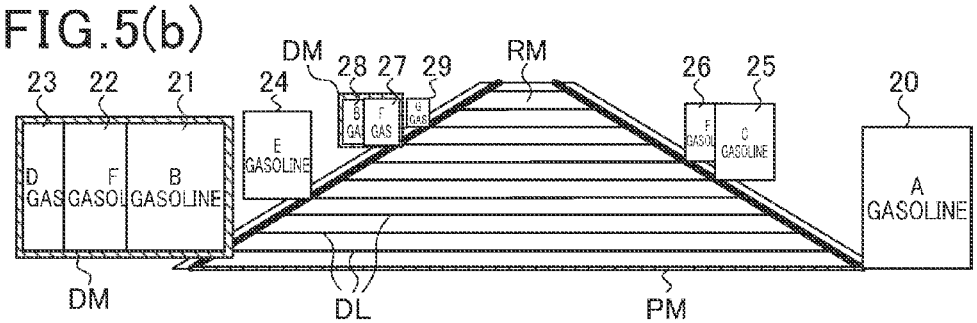
Figure 5C:
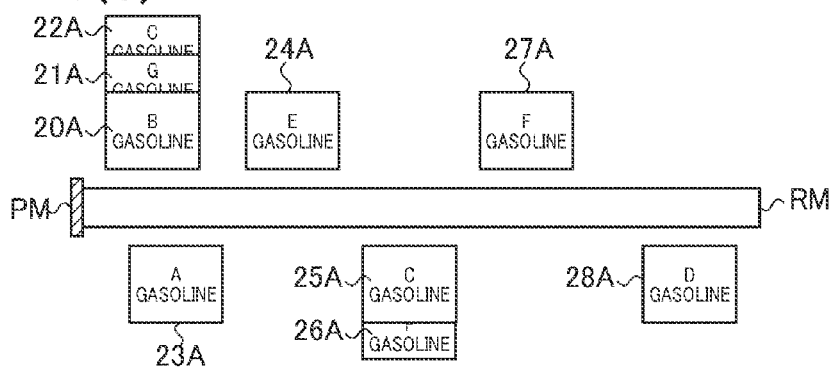
Figure 5D:
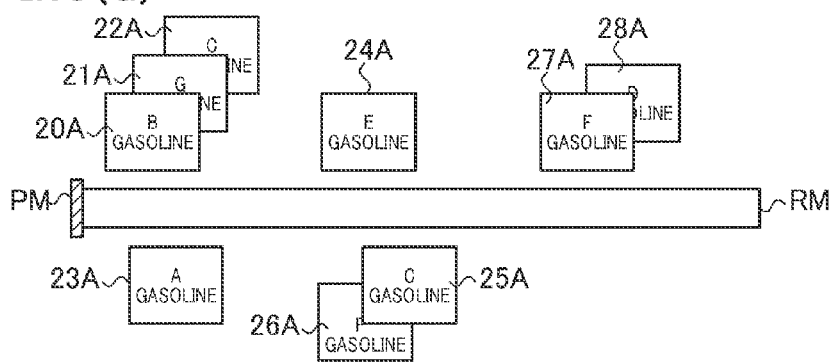

Further, in addition to the display mode exemplified in FIG. 5(a), the icon string display in Example 2 can be configured so that the icons 21 to 23 or 27 and 28 that indicate the presence of the facilities positioned at substantially the same distance from the current position of the vehicle are shown together with an equal distance mark DM indicating that those facilities are positioned at the same distance, as exemplified in FIG. 5(b). In this case, data for use in showing the equal distance mark UM are stored in the storage unit 1 in advance, for example, as the associated information display data 1C exemplified in FIG. 2(b), and acquired and used for the icon string display in Example 2 (see Step S5 in FIG. 3). Furthermore, another exemplary icon string display in Example 2 can also be configured so that icons 20A to 22A or 25A and 26A that indicate the presence of facilities positioned at the same distance from the current position of the vehicle are arranged in a vertically overlapping fashion, together with the current position mark PM, the road mark RM and the like, for example, as illustrated in. FIG. 5(c). Alternatively, as illustrated in FIG. 5(d), the icon string display in Example 2 can also be configured so that the icons 20A to 22A or 25A and 26A that indicate the presence of facilities positioned at the same distance from the current position of the vehicle are arranged in a diagonally overlapping fashion, together with the current position mark PM, the road mark RM and the like.

Figure 6A:
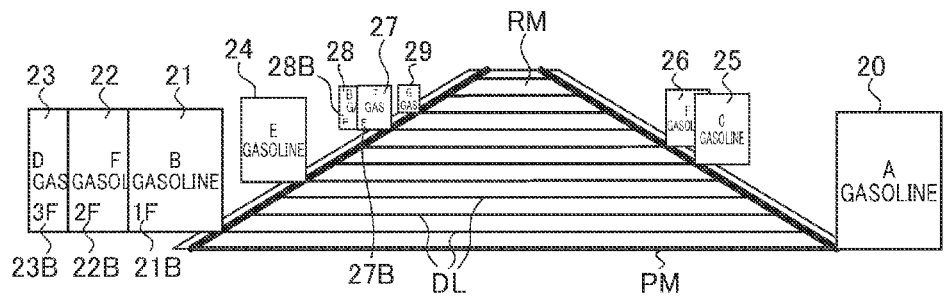
FIGS. 6(a) to 6(c) are exemplary icon displays (II) in Example 2.

Furthermore, as exemplified in FIG. 6(a), the icon string display exemplified in FIG. 5(a) can also be configured so that floor indications 21B, 22B, 23B, 27B and 28B are added to the icons 21 to 23, 27 and 28, respectively, that indicate the presence of the facilities positioned at the same distance from the current position indicated by the current position mark PM, and these icons are shown. The floor indication 21B, 22B, 23B, 27B and 28B indicate floors on which the gas stations with their presence indicated by the icons 21 and the like are placed. In this case, data for use in showing the floor indication 21B and the like are also stored in the storage unit 1 in advance, for example, as the associated information display data IC exemplified in FIG. 2(b), and acquired and used in accordance with the icon string display in Example 2 (see Step S5 in FIG. 3).

Figure 6B:
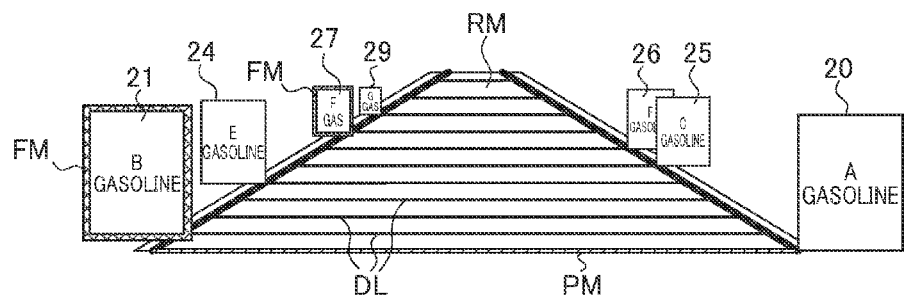

Further, as exemplified in FIG. 6(b), the icon string display exemplified in FIG. 5(a) can also be configured so that out of the icons 21 to 23 that indicate the presence of the gas stations positioned at the same distance from the current position of the vehicle, only the icon 21 that indicates the presence of the gas station "B gasoline" on the first floor in the building in which the above gas stations are placed is shown as a representative icon of the gas stations with their presence indicated by the icons 21 to 23. In addition to this, a hierarchy mark FM that indicates that the same type of facilities (gas stations) are also present on other floors is shown. In the case where the example in FIG. 6(b), similar to the icons 21 to 23 that indicate the presence of the gas stations positioned at the same distance from the current position of the vehicle in the example in FIG. 5(a), out of the icons 27 and 28 that indicate the presence of the gas stations positioned at the same distance, only the icon 27 that indicates the presence of the gas station "F gasoline" placed on the first floor in the building in which the above gas stations are placed is shown together with another hierarchy mark FM.

Figure 6C:
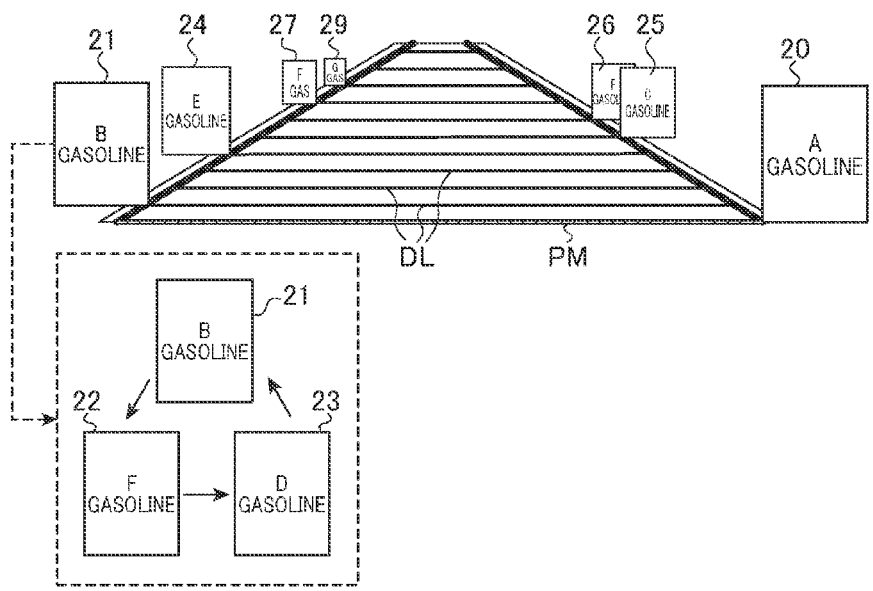

Alternatively, as exemplified in FIG. 6(c), the icon string display can also be configured so that out of the icons 21 to 23 that indicate the presence of the gas stations positioned at the same distance from the current position of the vehicle in the example in FIG. 5(a), only the icon 21 that indicates the presence of the gas station "B gasoline" on the first floor in the building in which the above gas stations are placed is temporarily shown. Then, the icon 21 and the icon 22 that indicates the presence of the gas station "F gasoline" and icon 23 that indicates the presence of the gas station "D gasoline," respectively, placed on other floors in the same building are shown alternately, for example, in a time division manner in which they are replaced with one another periodically. In this way, a display in which three gas stations are placed inside a single building can be created. The time-divisional replacement of the icons 21 to 23 in this case may be configured so that control data for replacement display control which are stored in the storage unit 1 in advance as the display control data LB, for example, exemplified in FIG. 2(b) are acquired in accordance with the icon string display in Example 2 (see Step S5 in FIG. 3), and the display data generating unit 3 shows the icons 21 to 23 alternately so as to be replaced with one another by using this control data (see Step S11 in FIG. 3).

As described above, according to the icon display process performed by the navigation system SS in Example 2, when a plurality of facilities are positioned at the same distance from the current position of a vehicle, icons including such as the icon 21 that indicate the plurality of facilities in such a way that they can be discriminated from one another are shown on the display 6 at positions corresponding to the positions of these facilities, as exemplified in FIG. 5(a). Consequently, in addition to the effect of the icon display process performed by the navigation system SS in Example 1, the icon display process performed by the navigation system SS in Example 2 produces an effect of making it possible to recognize more intuitively and promptly a plurality of facilities present at the same distance from the position of a vehicle.

Moreover, as exemplified in FIGS. 5(a) to 5(d), display information is generated, which is used to show icon terrestrial object indices that indicate a plurality of facilities positioned at the same distance, in such a way that their display positions are shifted from one another and they can thereby be discriminated from one another. This makes it possible to recognize simultaneously a plurality of terrestrial objects present at the same distance.

As exemplified in FIGS. 5(a) to 5(d), icons including each of such as the icon 21 are shown with their display positions shifted from one another in one direction (a lateral, vertical or diagonal direction in the drawing). This makes it possible to recognize simultaneously a plurality of terrestrial objects present at the same distance in an easily and visually perceivable display mode.

Furthermore, as exemplified in FIG. 5(b), an equal distance mark DM which indicates that a plurality of facilities are positioned at the same distance is shown together with icons including each of such as the icon 21. This also makes it possible to easily recognize the facilities to be positioned at the same distance.

As exemplified in FIGS. 5(a) to 5(d) and 6(a), icons including each of such as the icon 21 are shown in order related to a relationship among a plurality of facilities. This also makes it possible to recognize intuitively and promptly a mutual relationship among facilities positioned at the same distance.

Further, as exemplified in FIGS. 5(a) to 5(d) and 6(a), icons including each of such as the icon 21 are shown simultaneously in order related to a relationship among a plurality of facilities. This also makes it possible to recognize intuitively and promptly a mutual relationship among facilities positioned at the same distance.

Furthermore, as exemplified in FIG. 6(c), icons including each of such as the icon 21 are shown in order related to a relationship among a plurality of facilities and in a time divisional manner. This also makes it possible to recognize intuitively and promptly a mutual relationship among facilities positioned at the same distance.

Further, as exemplified in FIGS. 6(a) and 6(b), floor indications 21B and the like that indicate a relationship among a plurality of facilities and a hierarchy mark FM are shown together with icons including such as the icon 21. This also makes it possible to recognize intuitively and promptly a mutual relationship among facilities positioned at the same distance.

Further, as exemplified in FIG. 6(b), a hierarchy mark FM corresponding to a single facility is shown together with the icon 21 that indicates this single facility. It is thus possible to simplify the display state by decreasing the number of hierarchy marks FM and icons shown on the display 6, thus enhancing the visibility.

(III) Example 3

Next, a description will be given of Example 3 that is still another example according to the embodiment, with FIGS. 7(a) to 7(h). FIGS. 7(a) to 7(h) are exemplary icon displays in Example 3.

Further, a hardware configuration in a navigation system in Example 3 and a process of an icon string display in Example 3 are basically the same as the hardware configuration of the navigation system SS in Example 1 and the process described with FIG. 3, respectively. In FIGS. 7(a) to 7(h), accordingly, the same reference numerals are assigned to the same components as those in the navigation system SS in Example 1 (see FIGS. 2(a) to 2(c)) and the icon string display (see FIGS. 4(a) to 4(c)), and details thereof will not be described.

In Example 1 described above, the icon string display has been described regarding the case where display target facilities are present at different distances from the current position of the vehicle. In contrast to this, in Example 3 that will be described below, in the case where a search route in Example 1 is present, the present application is applied to the display of a destination at which a vehicle will terminate its movement. Or furthermore, when a search route is not present, the present application is applied to the display of an icon string display in which no facilities falling into a category to be shown are present at the along of a road on which a vehicle is moving.

Figure 7A:
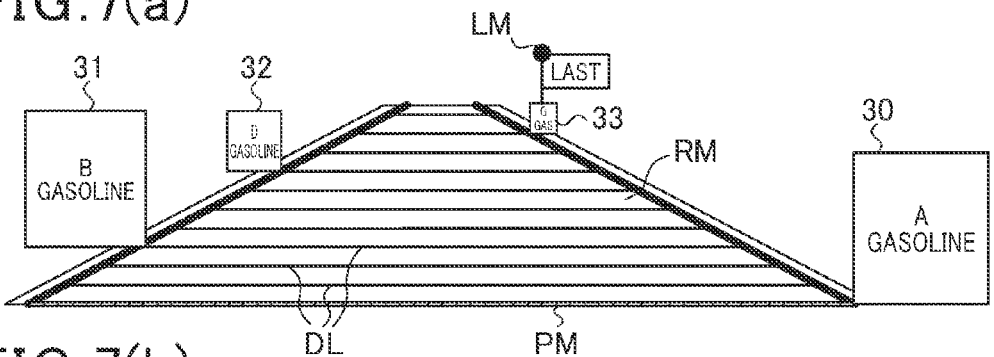
FIGS. 7(a) to 7(h) are exemplary icon displays in Example 3.
Figure 7B:
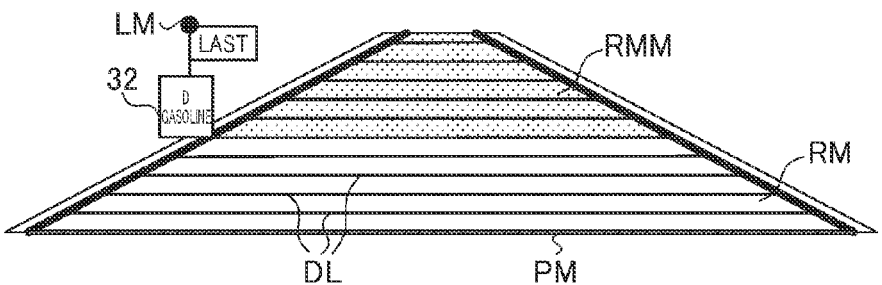
Figure 7C:
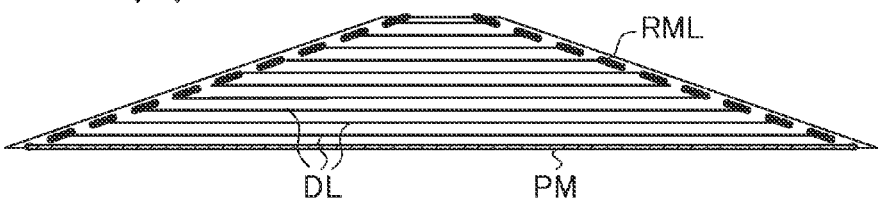
Figure 7D:
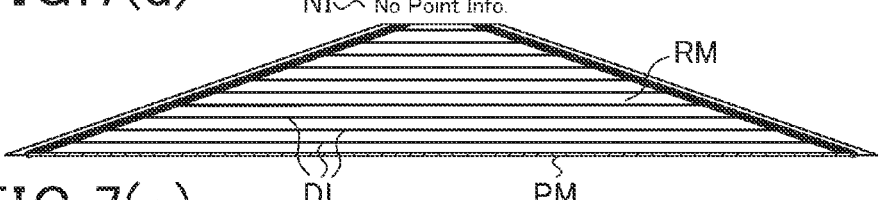
Figure 7E:
Figure 7F:
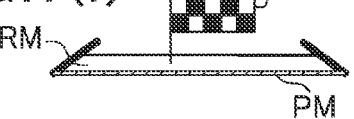
Figure 7G:
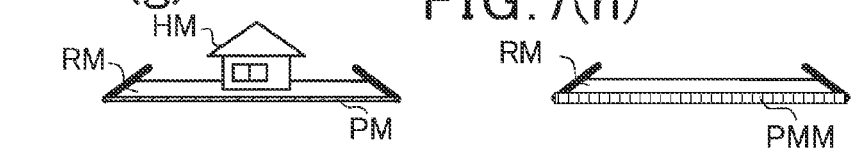
Figure 7H:
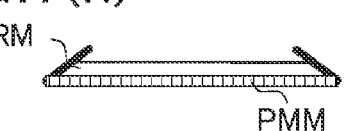

According to one aspect exemplified in FIG. 7(a), specifically, in the case where an icon display process in Example 3 is performed, a road mark RM, a current position mark PM and distance marks DL as in Example 1 (see FIGS. 4(a) to 4(c)), and icons 30 to 33 that indicate the presence of facilities corresponding to individual distances from the current position of a vehicle are shown on the display 6. In addition to these, in an icon string display in Example 3, a final mark is shown on an icon that indicates the presence of the last one of facilities that are arranged along a road on which the vehicle will move in the future and fall into a category of a current display target (see Step S11 in FIG. 3). This final mark indicates the last one of facilities, arranged along a road on which the vehicle is moving, that fall into a category of a display target. In the example in FIG. 7(a), for example, in the case that the last one of gas stations along a road on which the vehicle will move in the future is a gas station "G gasoline" with its presence indicated by an icon 33, the icon string display is configured so that a flag-shaped final mark LM, for example, with a word "LAST" is shown in association with the icon 33. In this case, data for use in showing the final mark LM are stored in the storage unit 1 in advance, for example, as the associated information display data 1C exemplified in FIG. 2(b), and acquired and used for the icon string display in Example 3 (see Step S5 in FIG. 3).

Further, in the icon string display in Example 3, road marks that indicate a road positioned farther away from the current position of the vehicle than the last facility on the road along which the vehicle will move in the future (i.e., a road within a region in which facilities falling into a category of a current display target are no longer present) are shown in a display mode different from that of road marks RM positioned forward of the last facility with respect to the current position of the vehicle (see Step S11 in FIG. 3). In the case of the example in FIG. 7(b), for example, the final mark LM is shown in association with the icon 32 that indicates the presence of the last gas station of "D gasoline" of gas stations falling into a category of a current display target of gas station. In addition to this, a road mark RMM is shown on a road positioned on the remote side of the gas station "D gasoline" with respect to the current position of the vehicle, in a display mode (dotted hatch area in FIG. 7(b)) different from that of the road mark RM. In this case, data for use in showing this road mark RMM are stored in the storage unit 1 in advance, for example, as the road-and-others display data 1D exemplified in FIG. 2(*b*), and acquired and used for the icon string display in Example 3 (see Step S5 in FIG. 3).

Furthermore, in the case where the vehicle moves to a region, such as a dead end, in which facilities falling into the category of a current display target are no longer present and then terminates its movement therein, the icon string display in Example 3 can be configured as follows. For example, a road mark RML formed of lines with a different shape as exemplified in FIG. 7(*c*) or, as an additional mark, a text mark NI indicating that effect as exemplified in FIG. 7(*d*) are shown, instead of the road mark RM (e.g., see FIGS. 4(*a*) to 4(*c*)) used when any facility falling into the category of a current display target is still present ahead. Data for use in showing the road mark RML or the text mark NI are stored in the storage unit 1 in advance, for example, as the road-and-others display data 1D exemplified in FIG. 2(*b*), and acquired and used for the icon string display in Example 3 (see Step S5 in FIG. 3). Alternatively, in the case where the vehicle moves to a region in which facilities falling into the category of a current display target are no longer present and then terminates its movement therein, the icon string display can be configured so that the road mark RM is shown in a flashing manner. In this case, control data for use in flashing the road mark RM are stored in the storage unit 1 in advance, for example, as the display control data 1B exemplified in FIG. 2(*b*), and acquired and used for the icon string display in Example 3 (see Step S5 in FIG. 3).

Further, the icon string display in Example 3 can be configured so that, for example, in the case where the vehicle arrives at the destination on the search route, arrival information is indicated, for example, by a destination mark DDM as exemplified in FIG. 7(*e*), a checkered flag mark EM as exemplified in FIG. 7(*f*), a home mark HM as exemplified in FIG. 7(*g*), or a current position mark PMM as exemplified in FIG. 7(*h*), the current position mark PMM being shown in a display mode, such as a color, different from that of the current position mark PM used before the arrival. Data for use in showing the destination mark DDM, the checkered flag mark EM or the home mark HM are stored in the storage unit 1 in advance, for example, as the associated information display data 1C exemplified in FIG. 2(*b*), and acquired and used for the icon string display in Example 3 (see Step S5 in FIG. 3). Data for use in showing the current position mark PMM are stored in the storage unit 1 in advance, for example, as the road-and-others display data 1D exemplified in FIG. 2(*b*), and acquired and used for the icon string display in Example 3 (see Step S5 in FIG. 3).

As described above, the icon display process performed by the navigation system SS in Example 3 shows a final mark LM that indicates the last one of facilities falling into the category of a current display target, a destination mark DDM that indicates the destination on a search route, and other indication marks, in such a way that they can be discriminated from other icons. Therefore, in addition to the effect of the icon display process performed by the navigation system SS in Example 1, the icon display process performed by the navigation system SS in Example 3 produces an effect of making it possible to recognize intuitively and promptly the presence of the last facility and the like, namely, facilities falling into the category of a display target to be no longer present behind the last facility or the like.

Further, a final mark LM (see FIG. 7(*a*)) which indicates that a facility indicated by a final mark LM or the like is the last one is shown while being included in an icon indicating the last facility or the like. This makes it possible to recognize the presence of the last facility or the like more intuitively and promptly.

Further, when any facility and the like that falls into the category of a display target is absent along a road on which a vehicle will move in the future, a road mark that indicates a road within this absent area is shown in a display mode different from that of a road mark RM that indicates a road within an area in which this facility and the like is present. More specifically, this road mark is one of a road mark RMM, a road mark RML, a road mark to which a text mark NI is added, a current position mark PMM shown in a different display mode, or a road mark RM shown in a flashing manner (see FIGS. 7(*b*) to 7(*d*)). This makes it possible to recognize more intuitively and promptly an area in which no facilities and the like are present along a road.

Furthermore, in the case where a search route to the destination is present, a destination mark DDM or the like that indicates this destination is shown (see FIGS. 7(*e*) to 7(*h*)). This makes it possible to recognize more intuitively the arrival at the destination on a preset search route.

(IV) Example 4

Next, a description will be given of Example 4 that is still another example according to the embodiment, with FIGS. 8(*a*) to 8(*e*). FIGS. 8(*a*) to 8(*e*) are exemplary icon displays in Example 4.

Further, a hardware configuration in a navigation system in Example 4 and a process of an icon string display in Example 4 are basically the same as the hardware configuration of the navigation system SS in Example 1 and the process described with FIG. 3, respectively. In FIGS. 8(*a*) to 8(*e*), accordingly, the same reference numerals are assigned to the same components as those in the navigation system SS in Example 1 (see FIGS. 2(*a*) to 2(*c*)) and the icon string display (see FIGS. 4(*a*) to 4(*c*)), and details thereof will not be described.

In Example 1 described above, the icon string display has been described regarding the case where display target facilities are present at different distances from the current position of the vehicle. In contrast to this, in Example 4 that will be described below, in the case where an icon is partially hidden by another icon positioned forward thereof when viewed at the current position of the vehicle in the icon string display in Example 1, the display mode of this partially hidden icon is changed such that the information indicated thereby can be visually perceived more easily.

Namely in the icon string display in Example 4, as exemplified in FIG. 8(*a*), icons 40 to 49 that indicate the presence of individual gas stations are shown together with a road mark RM, a current position mark PM and distance marks DL in the same display mode as in the icon string display in Example 1. In this state, for the icon string display in Example 4, the display data generating unit 3 moves vertically the display position of the icon 42 partially hidden by the icon 40 positioned forward thereof when viewed at the current position of the vehicle, as exemplified in FIG. 8(*b*). Alternatively, the display data generating unit 3 moves the display position of the icon 42 laterally, as exemplified in FIG. 8(*c*), or repeatedly moves it vertically or laterally. In this way, the gas station with its presence indicated by the icon 42 is visually perceived to be a "C gasoline" easily. The vertical or lateral movement of the icon 42 in this case may be configured, for example, by acquiring control data for icon movement stored in the storage unit 1 in advance as the display control data 1B exemplified in FIG. 2(*b*), in accordance with the icon string display in Example 4 (see Step S5 in FIG. 3) and causing the display data generating unit 3 to move and show icon 42 using this control data (see Step S11 in FIG. 3). The movement in this case may be configured to be made to move, for example, at preset time intervals, or configured to be made to move for only a preset time period, in response to an operation such the selection of an icon in the operating unit 4. Alternatively, for example, an icon that indicates the presence of a restaurant may be configured to start moving when a lunch time comes. Further, the whole of the icon 42 that has been partially hidden does not necessarily have to be visually perceived in the wake of the above movement. Alternatively, it may be still partially hidden after the movement, provided that the presence of the icon 42 and the content indicated thereby can be visually perceived.

Figure 8A:
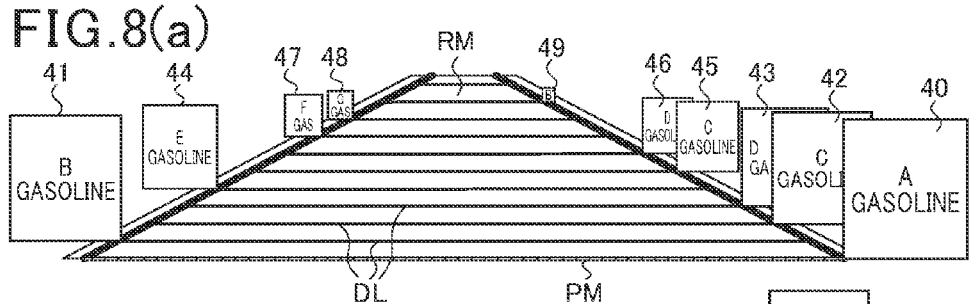
FIGS. 8(a) to 8(e) are exemplary icon displays in Example 4.
Figure 8B:
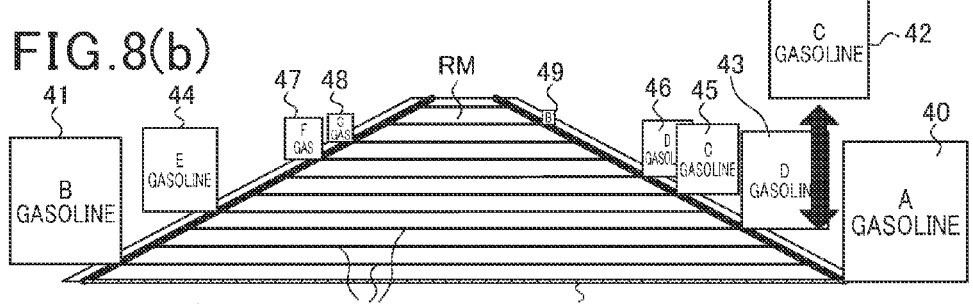
Figure 8C:
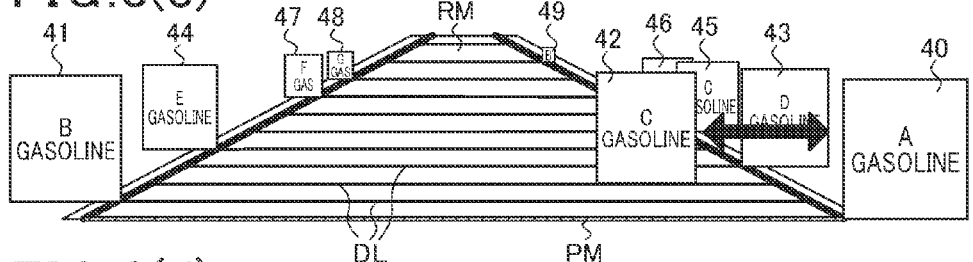

Further, another exemplary icon string display in Example 4 is not configured so that icons are moved as exemplified in FIGS. 8(b) and 8(c). Alternatively, for example, as exemplified in FIG. 8(d), it may be configured so that an icon 42-1 that is larger in size than the icon 40 and the like and shows the same content is shown instead of the icon 42 partially hidden by the icon 40. In this case, the icon display data 1A for use in showing the icon 42-1 are stored in the storage unit 1 in advance, for example, as the icon display data 1A exemplified in FIG. 2(b), and acquired and used for the icon string display in Example 4 (see Step S5 in FIG. 3).

Figure 8D:
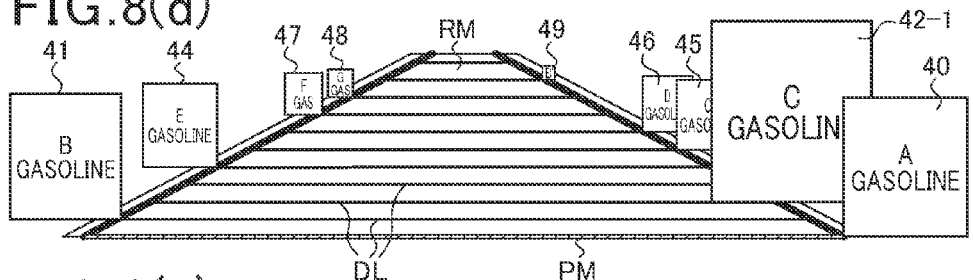
Figure 8E:
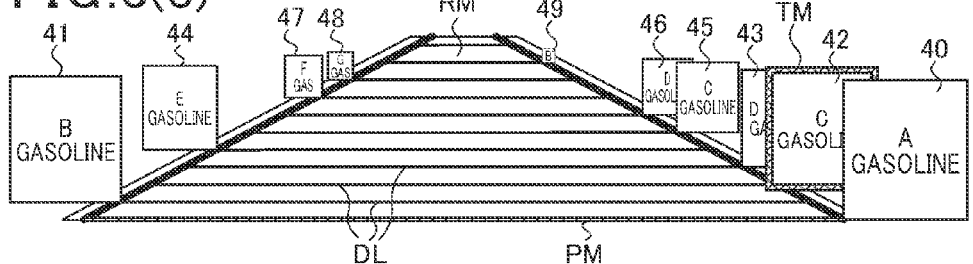

Furthermore, as exemplified in FIG. 8(e), the icon string display in Example 4 may be configured so that a featuring mark TM is shown in association with the icon 42 partially hidden by the icon 40; the featuring mark TM aims to make the icon 42 more visually prominent than the icon 40 and the like. In this case, data for use in showing the featuring mark TM are stored in the storage unit 1 in advance, for example, as the associated information display data 1C exemplified in FIG. 2(b), and acquired and used for the icon string display in Example 4 (see Step S5 in FIG. 3). Further alternatively, for example, the icon string display in Example 4 can also be configured so that the partially hidden icon 42 illuminates or flashes by itself, thereby becoming more visually prominent than the icon 40 and the like As described above, according to the icon display process performed by the navigation system SS in Example 4, in the case where at least two of the icons, including such as the icon 42, overlap one another and the visibility of the icon 42 is thereby reduced, the display mode of the icon 42 is changed in such a way that its reduced visibility is enhanced. Therefore, in addition to the effect of the icon display process performed by the navigation system SS in Example 1, the icon display process performed by the navigation system SS in Example 4 produces an effect of making it possible to recognize more intuitively and promptly facilities and the like with their presence indicated by the icon 42 and the like even when the icon 42 and the like are partially hidden.

Further, as exemplified FIG. 8(b) or 8(c), the icon 42 and the like are shown in such a way that each of their display positions is changed between an overlapping position and a position different from this overlapping position. This makes it possible to recognize intuitively and promptly facilities and the like with presence indicated by the icon 42 and the like while attracting a user's attention.

Further, in the case where the icon 42 and the like are shown in such a way that each of their display positions is repeatedly changed between the two positions as exemplified in FIG. 8(b) or 8(c), it is possible to recognize facilities and the like while attracting a user's attention more strongly.

Furthermore, in the case where the icon 42 and the like are shown in such a way that the whole of each icon can be viewed after it's movement, as exemplified in FIG. 8(b) or 8(c), since the whole of each of the icon 42 and the like can be viewed, it is possible therefore to recognize more intuitively and promptly facilities and the like with their presence indicated by the icon 42 and the like that have been partially hidden.

Further, in the case where the change in a display position, as exemplified in FIG. 8(b) or 8(c), is based on a user's operation, the display position is changed in response to the operation of the user who recognizes an icon string display. It is thus possible to change the display position at a timing that can attract user's attention.

Further, in the case where the change in a display position, as exemplified in FIG. 8(b) or 8(c), is made at preset time intervals, the repetition of the change in the display position can more attract user's attention.

Further, as exemplified in FIG. 8(d), in the case where the icon 42 and the like are shown in an enlarged fashion, it is possible to recognize facilities and the like with their presence indicated by the icon 42 and the like while attracting the attention of a user who visually perceives an icon string display.

Further, as exemplified in FIG. 8(e), in the case where featuring marks TM are contained in the icon 42 and the like, it is possible to recognize the facilities and the like indicated by the icon 42 and the like. Here, the featuring marks TM indicate the presence of the facilities and the like indicated by the icon 42 and the like by making the icon 42 and the like prominent.

Further, in the case where one or more of the icons, including the icon 42 and the like, are partially hidden, the display mode of these partially hidden icon 42 and the like may be configured to be changed so that their visibility is enhanced, in response to a user's selection operation. This configuration shows the icon 42 and the like while changing their display mode at a timing that can attract user's attention, thus making it possible to recognize more intuitively and promptly facilities with their presence indicated by the icon 42 and the like.

Further, in the case where one or more of the icons, including the icon 42 and the like, are partially hidden, the display modes of the icons including the icon 42 may be configured to be changed independently of one another at preset time intervals. This configuration can also attract user's attention.

(V) Example 5

Figure 9A:
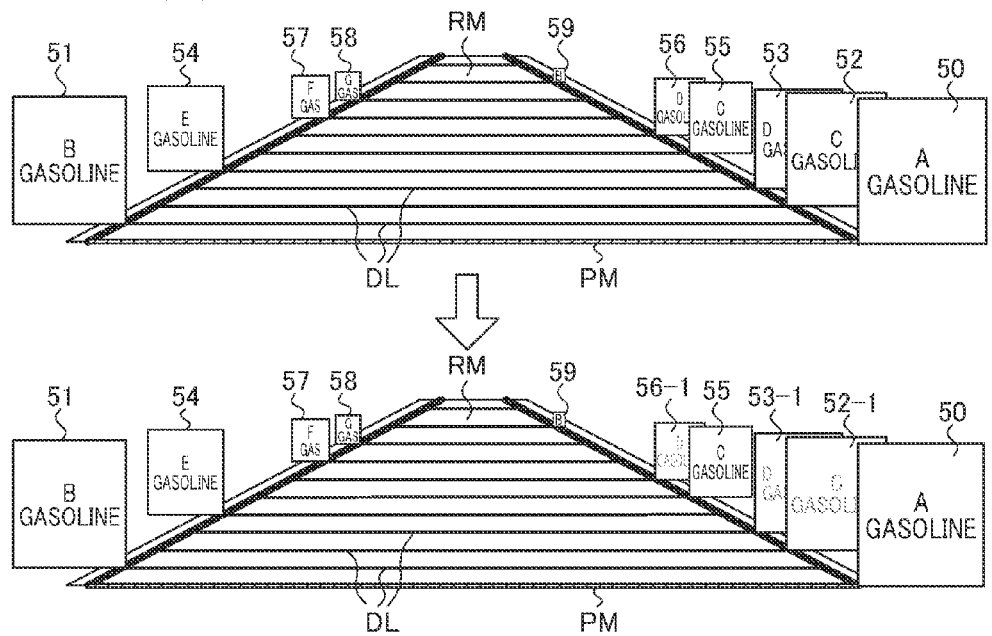
FIGS. 9(a) and 9(b) are exemplary icon displays in Example 5.
Figure 9B:
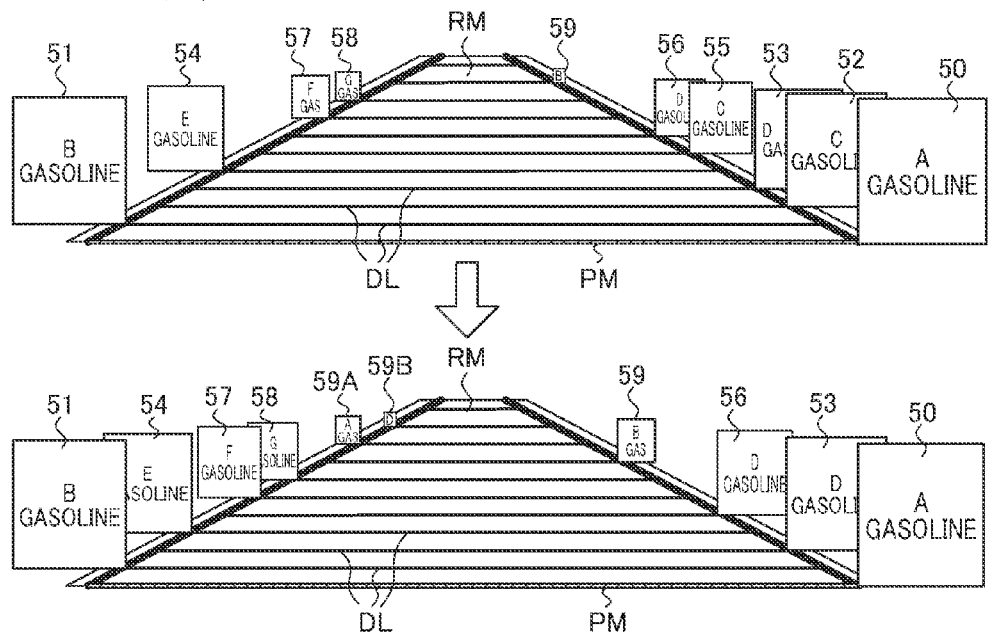

Next, a description will be given of Example 5 that is still another example according to the embodiment, with FIGS. 9(a) and 9(b). FIGS. 9(a) and 9(b) depict exemplary icon displays in Example 5.

Further, a hardware configuration in a navigation system in Example 5 and a process of an icon string display in Example 5 are basically the same as the hardware configuration of the navigation system SS in Example 1 and the process described with FIG. 3, respectively. In FIGS. 9(a) and 9(b), accordingly, the same reference numerals are assigned to the same components as those in the navigation system SS in Example 1 (see FIGS. 2(a) to 2(c)) and the icon string display (see FIGS. 4(a) to 4(c)), and details thereof will not be described.

In Example 1 described above, the icon string display that is based on only a distance from the current position of a vehicle has been described. In contrast to this, in Example 5 that will be described below, a discrimination condition is applied to the displays of icons in addition to their distances. If an icon indicates the presence of a facility, the attribute of which does not satisfy this discrimination condition, the display mode of this icon is changed so that its color becomes fainter than the others', or this icon is hidden.

Here, examples of the above discrimination condition in Example 5 include, for example, the service time of a facility, the presence/absence of a parking lot therein, the duplicate display of facilities in the same affiliated store group, a preset favorite facility, the presence/absence of a center divider, a crossing-prohibited area, or a combination thereof. These pieces of information may be acquired, for example, by referring to data stored in advance in the storage unit 1 or the display data generating unit 3 may acquire information regarding a service time and the like through a network such as the Internet.

Further, for example, the display data generating unit 3 in Example 5 displays such as an icon on the display 6 in such a way that its color becomes fainter than the others' (see Step S11 in FIG. 3), the icon indicating the presence of a facility that: has no parking lot; is one of facilities falling into the category or affiliation to be currently shown and are not positioned closet to the current position (e.g., including a facility in the category which appears at least twice upon forward and reverse movements); or a vehicle cannot enter because it cannot traverse an opposing lane due to the presence of a center divider or crossing-prohibited regulation. For this case, in FIG. 9(a), specifically, icons 50 to 59 that indicate individual gas stations would be shown together with a road mark RM, a current position mark PM and distance marks DL in the same display mode as in the icon string display in Example 1. However, in fact, icons 52-1, 53-1 and 56-1 are shown on the display 6, instead of the icons 52, 53 and 56, respectively, in a display mode in which their color is fainter than that of the other icons including the icon 50 and the like (see Step S11 in FIG. 3). Here, the icon 52-1 indicates the presence of gas station "C gasoline", the icon 53-1 indicates the presence of gas station "D gasoline", and the icon 56-1 indicates the presence of gas station "D gasoline", which a vehicle cannot enter through an opposing lane, for example, due to the presence of a center divider. In this case, the icon display data 1A for use in showing the icons 52-1, 53-1 and 56-1 are stored in the storage unit 1 in advance, for example, as the icon display data 1A exemplified in FIG. 2(b), and acquired and used for the icon string display in Example 5 (see Step S5 in FIG. 3). Further, in addition, the icons including the icon 50 aside from the icon 52-1, the icon 53-1 and the icon 56-1 that indicate the presence of the gas stations which a vehicle cannot enter through an opposing lane can be configured to be made more prominent, for example, by being rotated.

On the other hand, about an icon that indicates the presence of a facility, service time of which has been over, and an icon that indicates the presence of a facility other than one registered in preset, so-called favorite data (this facility itself or all facilities in the category into which this facility falls), the display data generating unit 3 in Example 5 deletes this icon itself from the display 6. For this case, in FIG. 9(b), specifically, icons 50 to 59 that indicate individual gas stations which would be shown together with the road mark RM, the current position mark PM and the distance marks DL in the same display mode as in the icon string display in Example 1. However, for example, in the case where the expiry of the service time of the gas stations "C gasoline" with their presence indicated by the icons 52 and 55 is found from data acquired, for example, through the above network, the display data generating unit 3 deletes the icons 52 and 55 from the display 6 (see Step S11 in FIG. 3). In this case, for example, in the case where the undeleted icons including the icon 50 and the like are shown on the display 6 in the same display mode as in the icon string display in Example 1, no icons are shown at positions of the distance marks DL corresponding to the deleted icons 52 and 55. Therefore, in the case where icons are deleted from the icon string display in Example 5, the display positions of the icons 53, 54 and 56 to 59 that indicate the presence of the gas stations positioned behind the deleted icon 52 and 55 with respect to the current position of the vehicle are sequentially displaced in the forward direction with respect to the current position of the vehicle. In other words, the icons 53, 54 and 56 to 59 that indicate the presence of the gas stations positioned on the remote side of the deleted icon 52 and 55 in the example illustrated in FIG. 9(b) are rearranged at closer positions by the display data generating unit 3 (see Step S10 or S14 in FIG. 3). Then, in the is string display in Example 5, the display data generating unit 3 proceeds to the display of new icons 59A and 59B, and therefore shows them in remote areas which have been empty due to this rearrangement, for example, on the left of the road mark RM (see Step S11 in FIG. 3). Here, the icons 59A and 59B indicate the presence of other facilities (their presence having not been shown so far) that fall into the category to be currently shown.

For the registration of the above favorite data, for example, history data regarding previous visits to facilities targeted for the icon string display are stored in advance in the storage unit 1 or the like. Then, the number of visits to facilities for each affiliation is counted on the basis of the history data, and is stored in the processing unit 2. The facilities for each affiliation are retrieved and sorted in the processing unit 2 in decreasing order of the number of visits. As the result of the sorting, the facilities are classified into upper and lower groups in accordance with a preset threshold number. Consequently, the facilities classified into the upper group can be configured to be stored in the storage unit 1 or the like as "favorite facilities" whereas the facilities classified into the lower group can be configured to be identified as ones other than favorite facilities.

As described above, according to the icon display process performed by the navigation system SS in Example 5, individual icons are shown in such a way that icons indicating facilities, such as actually unavailable facilities, and the like, the attributes of which do not satisfy a discrimination condition is lower in visibility than those indicating facilities and the like, the attributes of which satisfy the discrimination condition. Therefore, in addition to the effect of the icon display process performed by the navigation system SS in Example 1, the icon display process performed by the navigation system SS in Example 5 produces an effect of discriminating between facilities and the like that do and does not satisfy a discrimination condition, making it possible to recognize intuitively and promptly recognize them.

Further, as exemplified in FIG. 9(a), in the case where individual icons are shown, for example, in such a way that icons indicating facilities and the like, the service time of which has been over, are made lower in visibility than those indicating facilities and the like that are in the curse of the service time, this icon display process identifies an unavailable facility or the like due to off hours, making it possible to recognize this facility or the like intuitively and promptly.

Further, for example, in the case where individual icons are shown in such a way that icons indicating facilities and the like that have no parking lot are made lower in visibility than those indicating facilities and the like that have a parking lot, this icon display process identifies a facility or the like that has no parking lot and therefore cannot be used with vehicles, making it possible to recognize this facility or the like intuitively and promptly.

Furthermore, in the case where individual icons are shown in such a way that icons indicating facilities and the like on an opposing lane of a road indicated by the road mark RM at a position where the presence of a center divider is indicated are made lower in visibility than those indicating facilities and the like on an opposing lane at a position where the presence of a center divider is not indicated, this icon display process identifies a facility or the like on an opposing lane that a vehicle cannot enter due to the presence of a center divider, making it possible to recognize this facility or the like intuitively and promptly.

Further, in the case where individual icons are shown in such a way that icons indicating facilities and the like on an opposing lane of a road indicated by the road mark RM at a position designated as a crossing-prohibited position are made lower in visibility than those indicating facilities and the like on an opposing lane at a position not designated as a crossing-prohibited position, this icon display process identifies a facility or the like on an opposing lane that a vehicle cannot enter due to a crossing-prohibited position, making it possible to recognize this facility or the like intuitively and promptly.

Further, in the case where individual icons are shown in such a way that out of icons indicating facilities and the like falling into the same category, affiliation or the like, ones indicating facilities and the like that are not positioned closest to the position of a vehicle (e.g., including facilities in this category which are shown at least twice upon forward and reverse movements) are made lower in visibility than the one indicating the facility or the like positioned closest to the position of the vehicle, this icon display process identifies one of facilities and the like having the same attribute such as the same category which is positioned on a remote side, making it possible to recognize this facility or the like intuitively and promptly.

Further, in the case where individual icons are shown in such a way that icons indicating facilities and the like that do not have an attribute designated as a "favorite" are made lower in visibility than those indicating facilities and the like that have an attribute designated as a "favorite", this icon display process identifies a facility or the like that does not have a designated attribute, making it possible to recognize this facility or the like intuitively and promptly. In this case, in the case where a facility or the like, the number of previous visits to which is equal to or more than a preset number, is designated as the above "favorite," the operation itself of designating the designated attribute is unnecessary. Therefore, this icon display process easily identifies a facility or the like that does not have a designated attribute, making it possible to recognize this facility or the like intuitively and promptly.

Furthermore, in the case where an icon to be shown with its visibility lowered is deleted from the display 6, this icon display process makes it possible to recognize more clearly icons other than the icon to be shown with its visibility lowered.

Further, as exemplified in FIG. 9(b), in the case where the icon 52 and the icon 55 are hidden and the icons 53 and 56 that indicate other facilities and the like positioned on the remote side of the facilities and the like indicated by these icon 52 and icon 55 are shown on the display 6 at positions corresponding to those at which the icon 52 and the icon 55 would be shown, this icon display process identifies a facility or the like positioned on a remote side, making it possible to recognize this facility or the like intuitively and promptly.

Further, as exemplified in FIG. 9(b), icons including the icon 52 and the like are hidden, and icons including the icon 56 and the like are shown with their display positions changed. Then, when the icon 59A and the icon 59B that indicate other facilities and the like positioned on the remote side of those indicated by the icons including the icon 56 and the like are shown, this icon display process identifies a facility or the like positioned on a further remote side, making it possible to recognize this facility or the like intuitively and promptly.

(VI) Example 6

Next, a description will be given of Example 6 that is still another example according to the embodiment, with FIGS. 10(a) to 11(b). FIGS. 10(a) to 11(b) are exemplary icon displays in Example 6.

Further, a hardware configuration in a navigation system in Example 6 and a process of an icon string display in Example 6 are basically the same as the hardware configuration of the navigation system SS in Example 1 and the process described with FIG. 3, respectively. In FIGS. 10(a) to 11(b), accordingly, the same reference numerals are assigned to the same components as those in the navigation system SS in Example 1 (see FIGS. 2(a) to 2(c)) and the icon string display (see FIGS. 4(a) to 4(c)), and details thereof will not be described.

In Example 1 described above, the icon string display in which only icons indicating the presence of individual display target facilities are shown has been described. In Example 6 that has been described below, however, not only icons but also various associated displays are created together with these icons, whereby the present application is applied to associated information itself related to facilities with their presence indicated by the icons, or an icon string display that allows the presence of the associated information to be visually perceived.

Figure 10A:
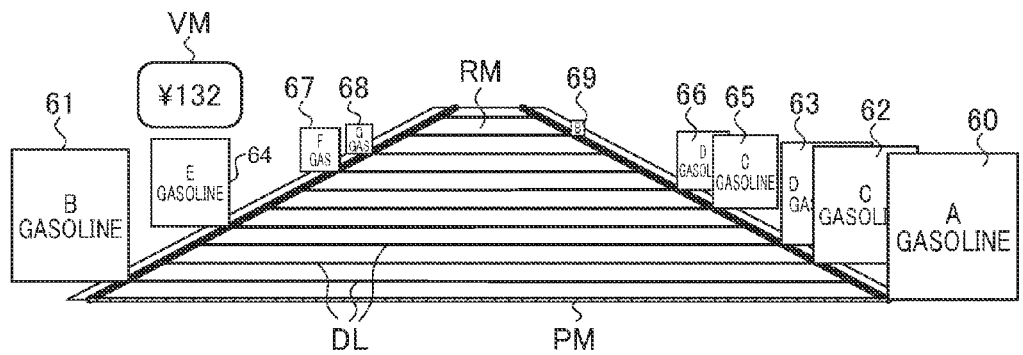
FIGS. 10(a) to 10(c) are exemplary icon displays (I) in Example 6.

Namely, according to one aspect exemplified in FIG. 10(a), in the case where an icon display process in Example 6 is performed, the display data generating unit 3 shows, on the display 6, a road mark RM, a current position mark PM, distance marks DL, and icons 60 to 69 which indicate the presence of facilities corresponding to individual distances from the current position of a vehicle, as in Example 1 (see FIGS. 4(a) to 4(c)). In addition to this, in the icon string display in Example 6, the display data generating unit 3 shows associated marks VM. Specifically, each associated mark VM contains associated information regarding a facility with its presence indicated by each of the icon 60 or the like, and is shown at a position where the relationship with the icon 60 or the like indicating the presence of the facility related to this associated information can be recognized. In the example in FIG. 10(a), an associated mark VM is shown above and close to the icon 64. The display content of this associated mark VM is the current unit price of gasoline (e.g., the unit price may correspond to each type of gasoline) in a gas station "E gasoline" with its presence indicated by the icon 64. In this case, data for use in showing the associated mark VM are stored in the storage unit 1 in advance, for example, as the associated information display data 1C exemplified in FIG. 2(b), and acquired and used for the icon string display in Example 6 (see Step S5 in FIG. 3). An exemplary display mode of the associated mark VM can be a fully painted or translucent display mode.

Figure 10B:
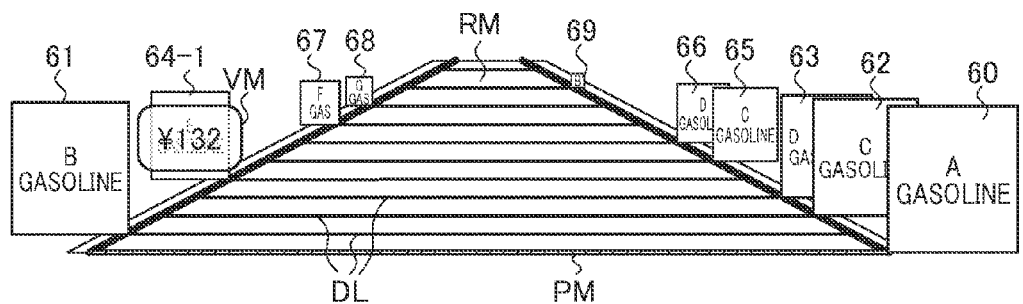
Figure 10C:
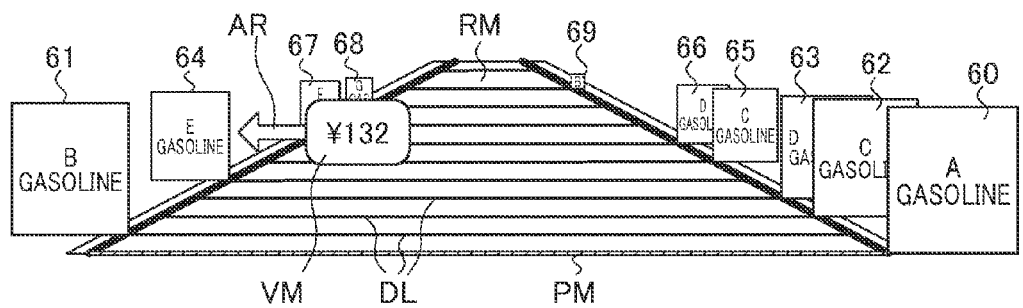

Further, another exemplary display mode of the associated mark VM in Example 6 may be configured so that the associated mark VM is shown so as to overlap the icon 64 that indicates the presence of the gas station "E gasoline" with its price indicated by the associated mark VM, and positioned forward of the icon 64 when viewed at the current position of a vehicle, for example, as exemplified in FIG. 10(*b*). Further, in addition, the icon 64 may be configured to be replaced with an icon 64-1 with a fainter color, as exemplified in FIG. 10(*b*), so that the content of the associated mark VM can be visually perceived easy. In this case, the icon display data 1A for use in showing the icon 64-1 are stored in the storage unit 1 in advance, for example, as the icon display data 1A exemplified in FIG. 2(*b*), and acquired and used for the icon string display in Example 6 (see Step S5 in FIG. 3). In the example in FIG. 10(*b*), an exemplary display mode of the associated mark VM can also be a fully painted mode or translucent display mode. Alternatively, the displays of the icon 64 and the corresponding associated mark VM can be configured to be replaced with each other at preset time intervals.

Moreover, the associated mark VM may be configured to be shown together with a relevant mark AR, for example, as exemplified in FIG. 10(*c*). The relevant mark AR clarifies the relationship between the associated mark VM and the icon 64 that indicates the presence of the facility related to the display content of the associated mark VM.

Figure 11A:
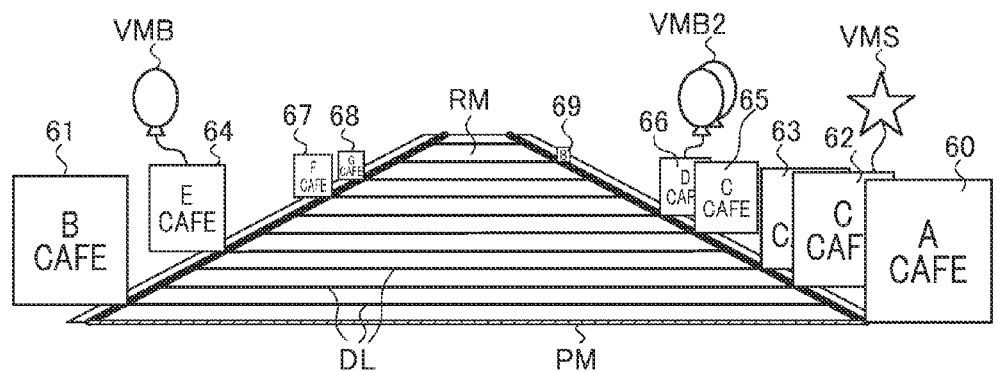
FIGS. 11(a) and 11(b) are exemplary icon displays (II) in Example 6.
Figure 11B:
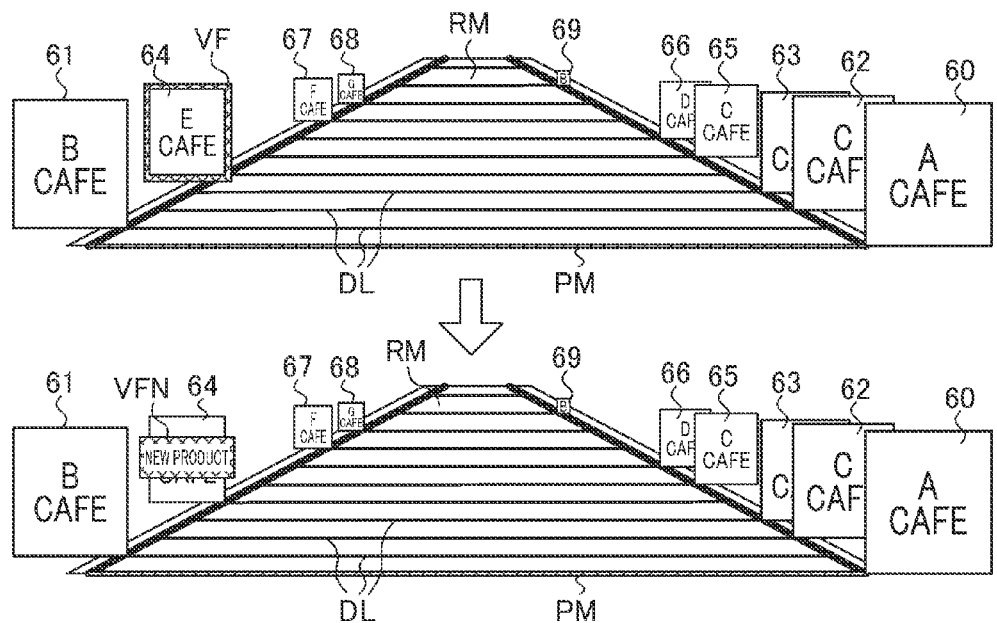

Furthermore, in the case where the display using text, such as the above gasoline price, is complicated (e.g., in the case where the facilities are cafes as exemplified in FIG. 11(*a*)), for example, as exemplified in FIG. 11(*a*), the associated information itself may not be shown directly. Instead, associated marks VMB, VMS and VMB2 that indicate the presence of the associated information may be configured to be shown in a display mode that enables the relationships with the icons 64, 66 or 62, respectively, to be recognized, each of the icons 64, 66 or 62 showing the presence of a facility that has associated information with its presence indicated by the associated mark VMB and the like. In this case, the icon display data 1A for use in showing the associated mark VMB and the like are stored in the storage unit 1 in advance, for example, as the associated information display data 1C exemplified in FIG. 2(*b*), and acquired and used for the icon string display in Example 6 (see Step S5 in FIG. 3). Further, as exemplified in FIG. 11(*a*), in the case where there is a single piece of associated information to be recognized, a single associated mark, such as the associated mark VMB or VMS is preferably used. In the case where there are a plurality of pieces of associated information to be recognized, an associated mark, such as the associated mark VMB2, is preferably used in a display mode that enables the number of pieces of associated information (two in the case of using the associated mark VMB2) to be recognized. Further, in addition to the display mode exemplified in FIG. 11(*a*), the display mode of a plurality of pieces of associated information may be configured so that a numeric character indicating the number of pieces of associated information is shown so as to overlap the associated mark. Then, in the case where the content of the associated information with its presence indicated by the associated mark VMB or the like is checked, the associated mark VMB or the like can be configured to show this content in response to a check operation in the operating unit 4, as an option.

Further, as exemplified in the upper part of FIG. 11(*b*), an associated mark VF can also be configured to indicate the presence of associated information, like a frame surrounding the icon 64 that indicates the presence of a facility which has associated information with its presence indicated by the associated mark VF. Then, when the icon 64 is selected through an operation in the operating unit 4, the associated mark VF is replaced with an associated mark VFN that indicates the content of the associated information, as exemplified in the lower part of FIG. 11(*b*). Furthermore, the associated mark VFN can be configured to be shown, for example, in a dynamically animated fashion. In these cases, data for use in showing the associated mark VF and the like are stored in the storage unit 1 in advance, for example, as the associated information display data 1C exemplified in FIG. 2(*b*), and acquired and used for the icon string display in Example 6 (see Step S5 in FIG. 3).

Further, specific examples of the associated information in the icon string display in the Example 6 include, for example, a price exemplified in FIGS. 10(*a*) to 10(*c*), as well as the evaluation of a facility or the like (so-called evaluations, etc. in blogs), data contained in so-called favorite data that the user of the navigation system SS has registered in advance (the data themselves are acquired, for example, from the storage unit 1 by the display data generating unit 3 through the preset registration performed by the user or his or her previous search history), information regarding new products of the facility, campaign information, congestion information (regarding the facility itself or empty spaces in its parking lot), and information regarding the presence/absence of a parking lot in the facility.

Furthermore, the display mode of the associated mark VM and the like may be configured so that, for example, information on a limit value such as the lowest price is always shown (namely, one associated mark VM shown for this facility), or one or more pieces of associated information that satisfy a specific condition that the user of the navigation system SS has set in advance.

About in the case where a plurality of facilities are present simultaneously, each of which has associated information to be shown, the following exemplary methods or the like are conceivable.

All the pieces of associated information are shown at once.

The pieces of associated information are replaced with one another at preset time intervals, for example, in increasing order of distance from the current position of a vehicle, in increasing order of price, or randomly.

Whether only one piece or all the pieces of associated information are shown is set arbitrarily by a user, and they are replaced in accordance with this setting.

Moreover, the user can set, in advance, the condition of a content to be shown as the associated information, and store this content in the storage unit 1. Then the associated information that reflects this set content can thereby be shown. For example, the following setting conditions can be conceivable as specific conditions set by the user.

For a price, the lowest or highest price is shown.

For an associated information on a price, the range of the price to be shown; an evaluation level; and the condition range of showing a distance between a facility related to this associated information and the current position of the vehicle, or the like are set.

Only one value is shown as the associated information on a price.

In the case where there are a plurality of pieces of associated information regarding one facility, only one piece or all the pieces of these are shown.

The type of associated information to be shown for one facility is selected. In this case, this selection can be conceived, for example, as an "AND condition" or an "OR condition."

Further, the above associated information may be configured to, for example, be stored in the storage unit 1 in advance, and acquired and shown by the display data generating unit 3. Alternatively, the associated information may be configured to be acquired from a non-illustrated external server apparatus through the above network, and shown.

As described above, according to the icon display process performed by the navigation system SS in Example 6, the associated mark VM or the like is shown on the display 6 at a display position corresponding to that of the icon 64 that indicates the facility or the like with which associated information is associated and independently of the icon 64. Therefore, in addition to the effect of the icon display process performed by the navigation system SS in Example 1, the icon display process performed by the navigation system SS in Example 6 shows an association with the facility or the like, and makes it possible to recognize the associated information easily. It is thus possible to recognize more intuitively and promptly associated information to which the above user wants to pay attention, and associated information regarding a facility that is considered to be the most important.

Further, as exemplified in FIG. 10(*a*), in the case where the associated mark VM or the like is shown at a display position adjoining to that of an icon, such as the icon 64, that indicates the facilities or the like with which associated information is associated, it is possible to recognize promptly the relationship between the associated information related to the associated mark VM or the like and the facility or the like with which this associated information is associated.

Further, as exemplified in FIG. 10(*b*), in the case where the associated mark VM or the like is shown so as to overlap the icon 64-1 that indicates a facility or the like with which associated information is associated, it is possible to recognize promptly the relationship between the associated information related to the associated mark VM or the like and the facility or the like with which this associated information is associated.

Furthermore, as exemplified in FIG. 10(*b*), in the case where the associated mark VM or the like is shown in such a way the icon 64-1 that the associated mark VM overlaps can be viewed, it is possible to recognize simultaneously both the associated information related to the associated mark VM or the like and the facility or the like with which this associated information is associated.

Further, in the case where the icon 64-1 and an associated mark VM or the like that would overlap each other are shown so as to be replaced with each other, it is possible to recognize equally both the associated information related to the associated mark VM or the like and the facility or the like with which this associated information is associated.

Further, as exemplified in FIG. 10(*c*), in the case where the relevant mark AR is shown in addition to the icon 64, the associated mark VM and the like, it is possible to recognize promptly and clearly the relationship between the associated information related to the associated mark VM or the like and the facility or the like with which this associated information is associated.

Furthermore, as exemplified in FIG. 11(*a*) or 11(*b*), in the case where the associated mark VMB, VMS and VMB2 are shown for respective facilities and the like, it is possible to recognize intuitively the presence of associated information related to each facility or the like.

Further, as exemplified in FIG. 11(*b*), in the case where the shown associated mark VF is selectable and the content of the associated information related to the selected associated mark VF is shown, it can be recognized promptly through a simple operation.

Further, in the case where the associated mark VMB2 contains information regarding the number of pieces of associated information, like the associated mark VMB2 exemplified in FIG. 11(*a*), it is possible to recognize intuitively the presence of associated information related to a facility or the like.

(VII) Example 7

Next, a description will be given of Example 7 that is still another example according to the embodiment, with FIGS. 12(*a*) to 14. FIGS. 12(*a*) to 14 are exemplary icon displays in Example 7.

Further, a hardware configuration in a navigation system in Example 7 and a process of an icon string display in Example 7 are basically the same as the hardware configuration of the navigation system SS in Example 1 and the process described with FIG. 3, respectively. In FIGS. 12(*a*) to 14, accordingly, the same reference numerals are assigned to the same components as those in the navigation system SS in Example 1 (see FIGS. 2(*a*) to 2(*c*)) and the icon string display (see FIGS. 4(*a*) to 4(*c*)), and details thereof will not be described.

The Example 7 that will be described below is the example about the change of the icon string display when one icon is selected through an operation in the operating unit 4, in the case where the icon string display in Example 1 is displayed. Further, the word "selection" in Example 7 that will be described below implies the following two cases.

For example, a non-illustrated selection cursor travels (is moved) over a plurality of icons, and stops moving on a specific icon to be selected. Then, a decision operation is performed.

In the course of the travel (movement) of above cursor over a plurality of icons, it is simply positioned on a specific icon (i.e., this cursor is positioned on the specific icon but no decision operation has not been performed on this specific icon).

Namely, in an icon display process in Example 7, there is the case where a road mark RM, a current position mark PM, distance marks DL, and icons 70 to 79 that indicates the presence of facilities corresponding to individual distances from the current position of a vehicle are shown, as in Example 1 (see FIGS. 4(*a*) to 4(*c*)). Then, for example, when the icon 72 is selected through an operation in the operating unit 4, a selection mark SM that indicates that the icon 72 has been selected is shown, for example, directly below the icon 72, as exemplified in FIG. 12(*a*). In addition, information or the like, for example, formed of text, regarding the facility with its presence indicated by the selected icon 72 is shown within a predetermined display region DA. Further in this case, the current position mark PM shown in Example 1 is hidden, for example, in order to enhance the visibility of the content shown within the display region DA. In this case, data for use in showing the selection mark SM and the like are stored in the storage unit 1 in advance, for example, as the associated information display data LC exemplified in FIG. 2(*b*), and acquired and used for the icon string display in Example 7 (see Step S5 in FIG. 3).

Further, another exemplary icon string display in Example 7 can be configured as follows. Both the selection mark SM and the display region DA are shown as a result of selecting the icon 70, for example, as exemplified in the upper part of FIG. 12(*b*), and then an icon 73 is newly selected. In response, both the selection mark SM and the display region DA for the icon 73 are shown, as exemplified in the lower part of FIG. 12(*b*). In addition, all the icons 70 to 72 that have been shown forward of the icon 73 when viewed at the current position of the vehicle are deleted from the icon string display, and the content of the icon string display sequentially transits to the forward side, so that the selected icon 73 is positioned at the forefront. In this case, icons 79A to 79C that indicate the presence of new facilities are additionally shown at display positions on the remote side of the original position of the icon 79, depending on the distance from the current position of the vehicle and which side of a road, the vehicle will move in the future, the facility is positioned on. This screen transition may be configured so that control data for icon movement (screen transition) are stored in the storage unit 1 in advance, for example, as the display control data 1B exemplified in FIG. 2(*b*), and acquired for the icon string display in Example 7 (see Step S5 in FIG. 3). Then, the display data generating unit 3 uses this control data to move and show the icon 73 and the like (see Step S11 in FIG. 3). Further, in the case of the example in FIG. 12(*b*), for example, the icon 70 is shown at the forefront, then the icon 70, the icon 71 and the icon 72 are selected in this order, and the icon 73 is finally selected as a selection target. The screen transition in Example 7 in this case is that the selection mark SM is sequentially and repeatedly shown directly below the currently selected icon 70 and the like. In addition, icons that have been shown forward of the respective selected icons are sequentially deleted, and finally the icon 73 is shown at the forefront, as exemplified in the lower part of FIG. 12(*b*). Further, in the case of this example in FIG. 12(*b*), and the icon 73 shown at a remote position is directly selected, for example, using a touch panel, the screen transition in Example 7 is made so that the selection mark SM moves immediately to a position directly below the selected icon 73, and the icons 70 to 72 that have been shown forward of the selected icon 73 is deleted at once. As a result, the icon string display exemplified in the lower part of FIG. 12(*b*) is created.

Further, still another exemplary icon string display in Example 7 can also be configured so that, for example, in the case where the icon 70 exemplified in FIG. 12(*a*) is selected, icons that indicate facilities positioned opposite the facility with its presence indicated by the selected icon 70 across the road can be configured to be lowered in visibility.

More specifically, the display data generating unit 3 can be configured to replace icons that indicate the presence of facilities on the opposite side with icons 71-1, 74-1, 77-1 and 78-1 that have a fainter color, or lowered visibility, as exemplified in FIG. 13(*a*). In this case, the icon display data 1A for use in showing the icons 71-1, 74-1, 77-1 and 78-1 are stored in the storage unit 1 in advance, for example, as the icon display data 1A exemplified in FIG. 2(*b*), and acquired and used for the icon string display in Example 7 (see Step S5 in FIG. 3).

Further, as exemplified in FIG. 13(*b*), for example, the display data generating unit 3 can be configured to maintain the display mode of the icons 71, 74, 77 and 78 that indicate the presence of facilities on the opposite side, but show a selection mark SSM so as to surround the icon 70 as well as the icons 72, 73, 75, 76 and 79 that indicate the presence of other facilities on the same side as the facility with its presence indicated by the selected icon 70. In this case, data for use in showing the selection mark SSM are stored in the storage unit 1 in advance, for example, as the associated information display data 1C exemplified in FIG. 2(*b*), and acquired and used for the icon string display in Example 7 (see Step S5 in FIG. 3).

Furthermore, as exemplified in FIG. 13(*c*), for example, the display data generating unit 3 may be configured to delete all the icons 71, 74, 77 and 78 that indicate the presence of the facilities on the opposite side.

Moreover, as exemplified in FIG. 13(*d*), for example, the display data generating unit 3 can be configured to replace the icons, including the selected icon 70, that indicate the presence of the facilities positioned at least preset distance away from the current position of the vehicle with icons 75-1 to 79-1 having a fainter color, or lowered visibility. In this case, the icon display data 1A for use in showing the icons 75-1 to 79-1 are stored in the storage unit 1 in advance, for example, as the icon display data 1A exemplified in FIG. 2(*b*), and acquired and used for the icon string display in Example 7 (see Step S5 in FIG. 3). Alternatively, a facility with its presence indicated by a replaced icon having lowered visibility can also be positioned on the remote side of a position corresponding to a preset traveling time from the current position of the vehicle. In this case, the traveling time may be calculated, for example, from an average speed at the current position of the vehicle by a predetermined calculation method or from a legal speed of the road of the current position of the vehicle by a predetermined calculation method.

Further, in the process of selecting an icon in the icon string display in Example 7, when a facility on an opposing lane of a road along which a vehicle moves is selected, a selecting sequence can be set, for example, in consideration of the situation in which the vehicle cannot move through the opposing lane due to the presence of the center divider or the like. To be more specific, as exemplified in FIG. 14, four gas stations are present on an opposing lane, and icons 70, 72, 75 and 76 indicating their presence are shown. The relationship among actually necessary distances over which a vehicle moves to these gas stations (through a U-turn, etc.) and which are restricted, for example, by the presence of a center divider is as follows.

The gas station "A gasoline" with its presence indicated by the icon 70>the gas station "C gasoline" with its presence indicated by the icon 75>the gas station "C gasoline" with its presence indicated by the icon 72>the gas station "D gasoline" with its presence indicated by the icon 76 (i.e., a center divider or the like is provided at the position of the gas stations "C gasoline" with their presence indicated by the icons 75 and 72.) In this case, in the case where a selection operation is initiated from the icon 70 and repeated as in the example of the uppermost part of FIG. 14, the order in which the icons are selected (i.e., the order of facility for which the selection mark SM is shown and information and the like are shown within the display region DA (not illustrated in FIG. 14)) is the icon 70, the icon 75, the icon 72 and the icon 76, in this order as exemplified in FIG. 14.

Figure 14:
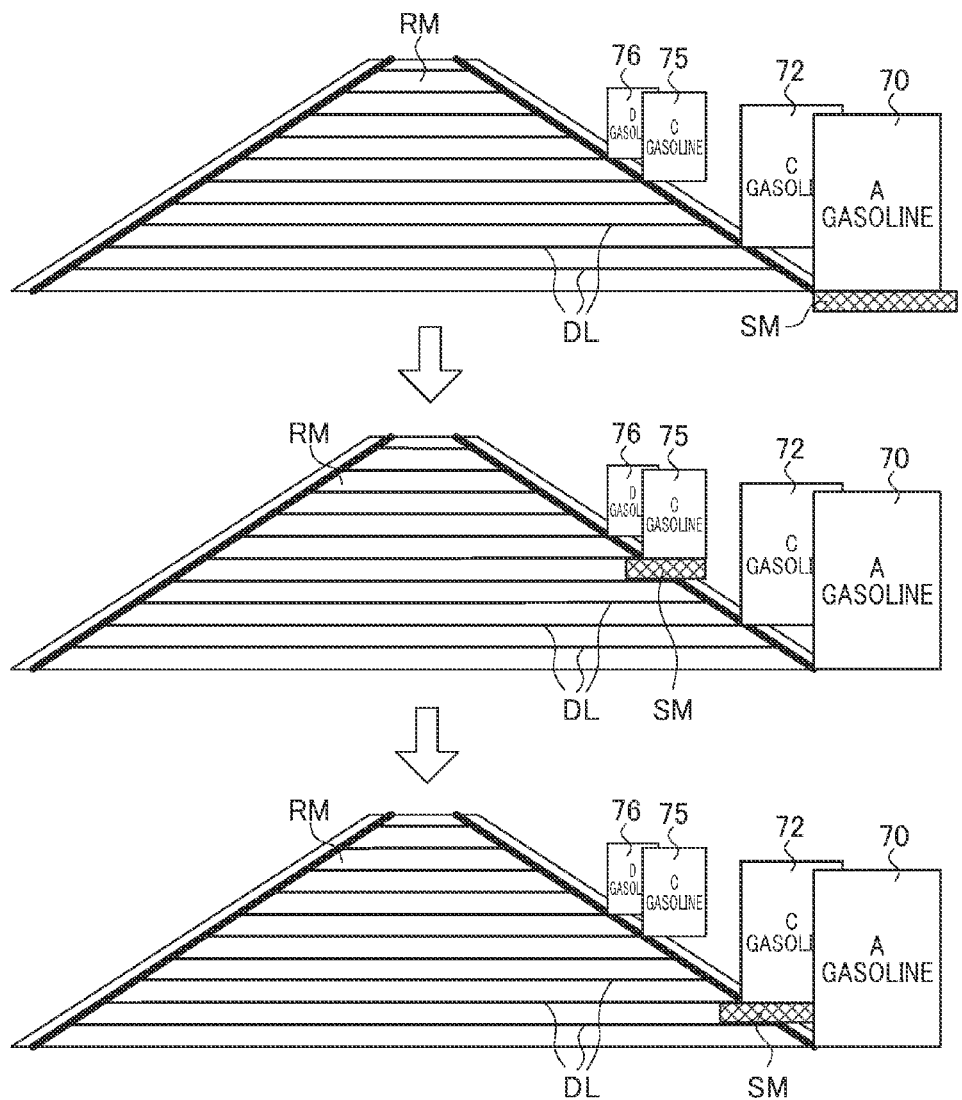
FIG. 14 is an icon display example (III) in Example 7.

Further, the description of the example in FIG. 14 has been given regarding the case where the icon selection process in Example 7 is applied to the selection of facilities on an opposing lane. In addition, Example 7 is also applicable to a case where a facility is present on a lane along which a vehicle moves and the vehicle needs to take a detour, for example, to follow a traffic regulation when moving to this facility. In this case, the icons are selected in order according to this detour circuit.

Figure 12A:
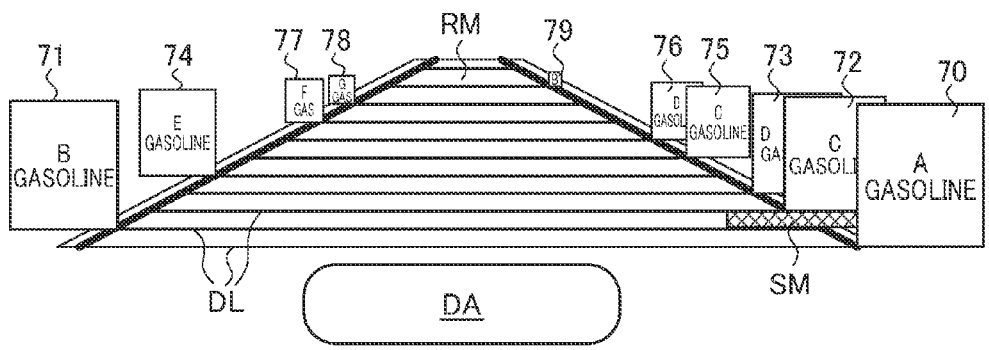
FIGS. 12(a) and 12(b) are exemplary icon displays (1) in Example 7.

Further, the icon selection process for the icon string display in Example 7 can also be configured so that a non-illustrated cursor for an icon selection is moved only over the icons shown side by side on the right side of the road, for example, in the example in FIG. 12(a), namely, the icon 70, the icon 72, the icon 73, the icon 75 and the icon 76 are selected in this order. In addition, the icon 71, the icon 74, the icon 77 and the icon 78 on the opposite side (left side in this case) of the road then can also be configured to be shown with their visibility lowered. When icons are sequentially selected while a cursor is being moved in the direction from the front on the display to the depth thereon, this configuration prevents the icons from being selected in a laterally zigzag pattern, namely, the icon 70, the icon 71, the icon 72 and the icon 74 . . . from being selected in this order, in the case of FIG. 12(a). Therefore, it can prevent the visibility between icons on the right and left sides from being switched (more specifically, for example, these icons from flickering), whenever an icon is selected in the above zigzag-pattern.

As described above, according to the icon display process performed by the navigation system SS in Example 7, a selection mark SM is shown upon selection of an icon. Therefore, in addition to the effect of the icon display process performed by the navigation system SS in Example 1, the icon display process performed by the navigation system SS in Example 7 produces an effect of making it possible to recognize more intuitively and promptly which icon is currently selected, which icon will be selected in the future, and information regarding a selected icon, thereby improving the visibility and recognition of an icon to be selected and lessening a load on a user.

Further, as exemplified in FIGS. 12(a) to 14, when an icon, such as the icon 71, other than the icon 70 positioned closest to the position of a vehicle is selected, a current position mark PM is hidden. This makes it possible to recognize intuitively the selection of a facility positioned on the remote side of the position of a vehicle.

Figure 12B:
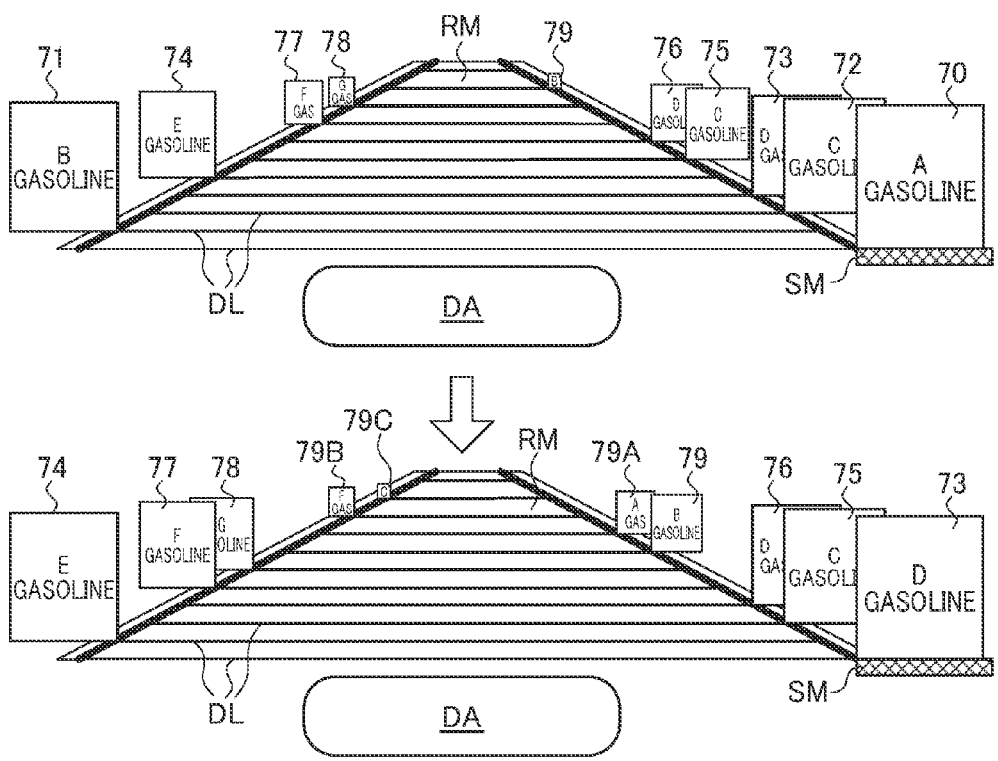

Further, as exemplified in FIG. 12(b), when the icon 73 other than the icon 70 positioned closest to the position of a vehicle is selected, the selected icon 73 is shown at a display position corresponding to the closest position of the vehicle. This makes it possible to recognize intuitively a facility or the like indicated by the selected icon 73.

Furthermore, as exemplified in FIG. 12(b), an icon, such as the icon 74, other than an icon that indicates another facility or the like positioned farther away from the position of a vehicle than the facility or the like indicated by the selected icon 73 is shown at a display position corresponding to a position close to the display position of the icon 73 that has not been selected. This makes it possible to recognize more intuitively facilities and the like positioned farther away from the current position of the vehicle than the facility or the like indicated by the selected icon 73.

Further, as exemplified in FIG. 12(b), the display positions of the icon 73 to the icon 79 on the display 6 are moved, and then the icon 79A to the icon 79C that indicate other facilities and the like positioned on the remoter side are shown at the display positions where the icon 73 to the icon 79 have been shown. This makes it possible to identify and recognize other facilities and the like positioned on the remote side of those with their display positions moved.

Figure 13A:
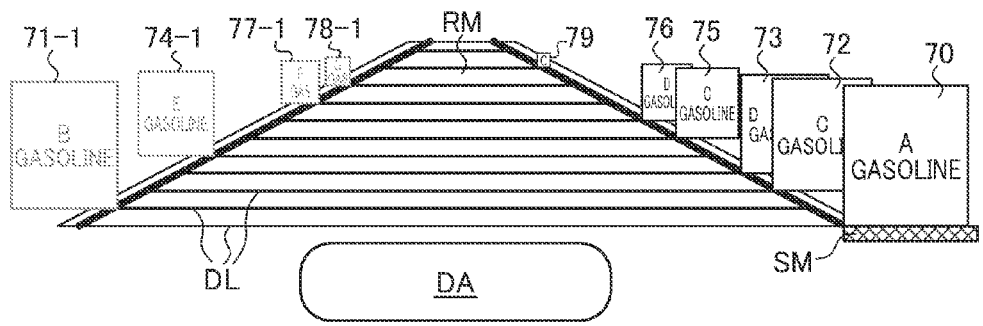
FIGS. 13(a) to 13(d) are exemplary icon displays (II) in Example 7.
Figure 13B:
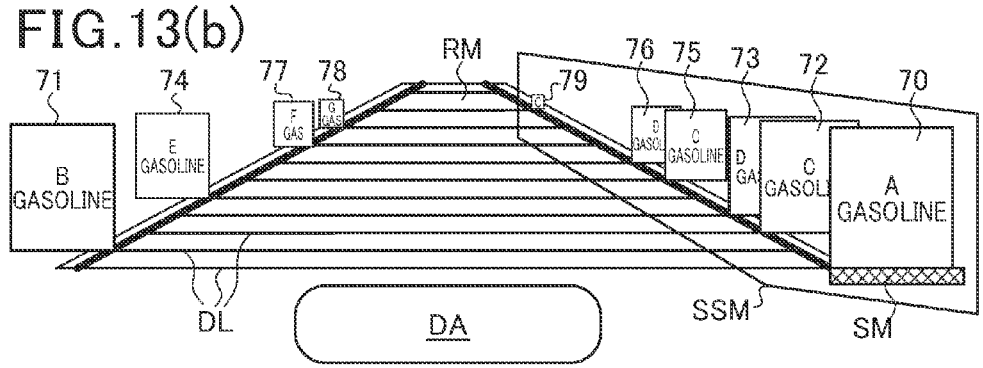
Figure 13C:
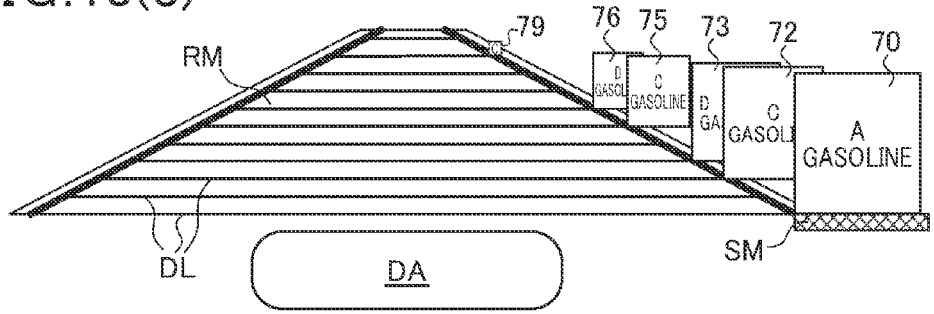

Further, as exemplified in FIGS. 13(a) to 13(c), in the case where an icon, such as the icon 71-1, that indicates the facility or the like on the opposite side of the facility or the like indicated by the selected icon 70 is made lower in visibility than the selected icon 70, it is possible to recognize more intuitively and promptly the facility or the like indicated by the selected icon 70.

Further, as exemplified in FIGS. 13(a) to 13(c), in the case where the icon 71, the icon 74, the icon 77 and the icon 78 that indicate the facilities and the like on the opposite side of a road are made lower in visibility than the icon 72, the icon 73, the icon 75, the icon 76 and the icon 79 that indicate other facilities on the side of the road on which the facility or the like indicated by the selected icon 70 is positioned, it is also possible to recognize more intuitively and promptly other facilities and the like on the side of the road on which the facility or the like indicated by the selected icon 70 is positioned.

Further, as exemplified in FIG. 13(c), in the case where the icons including such as the icon 71 that indicate facilities and the like on the opposite side of the road are hidden, it is possible to recognize more intuitively and promptly a terrestrial object indicated by a selected terrestrial object index.

Figure 13D:
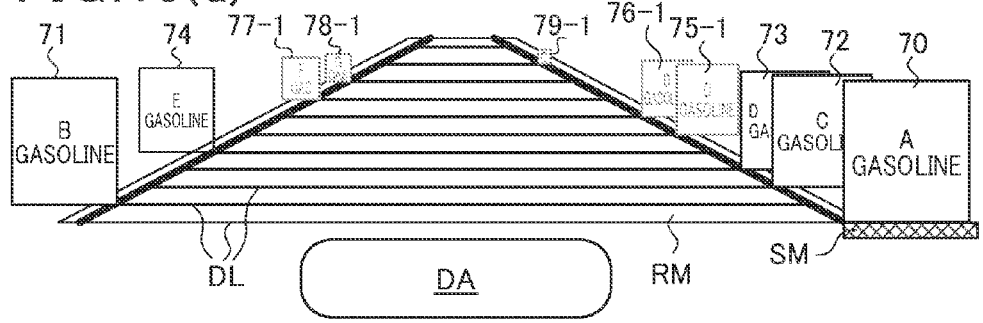

Furthermore, as exemplified in FIG. 13(d), the icons 75-1 to 79-1 that indicate other facilities and the like which are at least preset distance or traveling time away from that of a terrestrial object indicated by the selected icon 70 (i.e., the current position of the vehicle) are made lower in visibility than the selected icon 70. This makes it possible to recognize more intuitively and promptly facilities and the like positioned close to the facility or the like indicated by the selected icon 70.

Further, as exemplified in FIG. 14, in the case where the plurality of icon 70, icon 72, icon 75 and icon 76 that indicate a plurality of facilities and the like are sequentially selected, the selection of the icon 72 and the icon 75 that indicate the individual facilities and the like is switched in order according to an actually necessary traveling distance 20 over which a vehicle moves to the facilities and the like. This makes it possible to recognize a terrestrial object with a sense equivalent to an actual traveling distance sense.

(VIII) Example 8

Figure 15A:
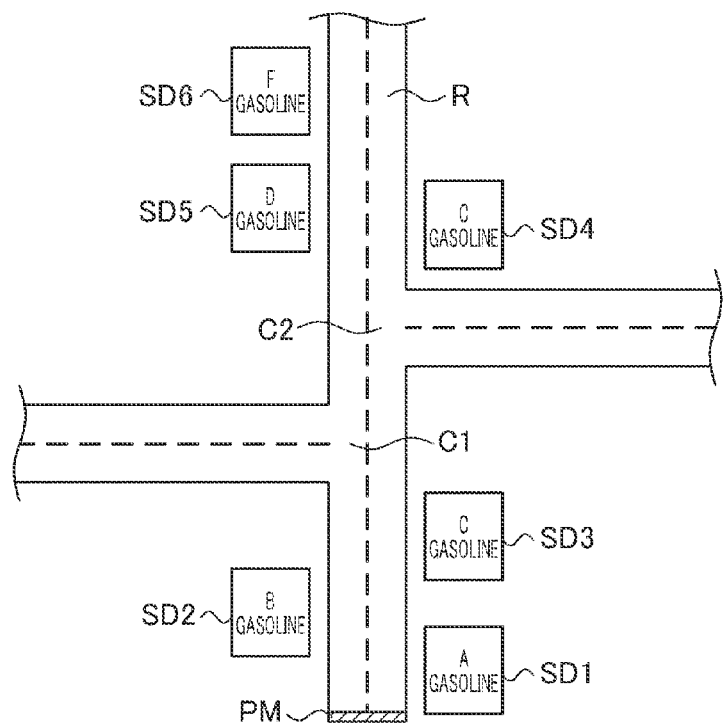
FIGS. 15(a) and 15(b) are exemplary icon displays (I) in Example 8.
Figure 15B:
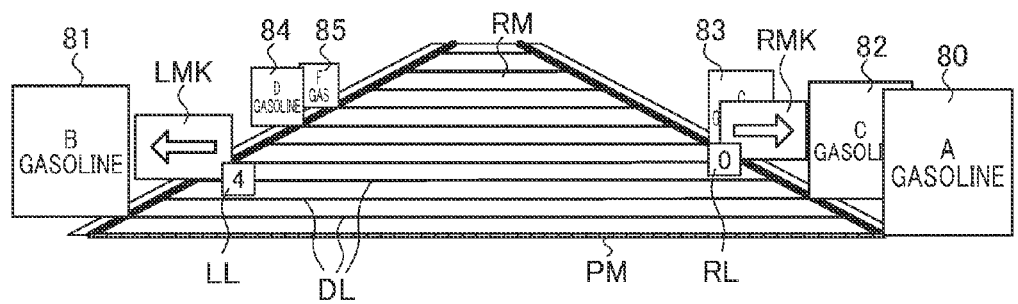

Finally, a description will be given of Example 8 that is still another example according to the embodiment, with FIGS. 15(a) to 18(b). FIGS. 15(a) and 15(b) are an exemplary icon display and the like in Example 8; FIGS. 16(a) to 18(b) are exemplary icon displays in Example 8.

Further, a hardware configuration in a navigation system in Example 8 and a process of an icon string display in Example 8 are basically the same as the hardware configuration of the navigation system SS in Example 1 and the process described with FIG. 3, respectively. In FIGS. 15(a) to 18(b), accordingly, the same reference 10 numerals are assigned to the same components as those in the navigation system SS in Example 1 (see FIGS. 2(a) to 2(c)) and the icon string display (see FIGS. 4(a) to 4(c)), and details thereof will not be described.

In Example 1 described above, the icon string display in which icons of facilities and the like positioned along a road on which a vehicle will move in the future are shown in accordance with a distance from the current position of the vehicle has been described. In contrast to this, in Example 8 that will be described below, a description will be given of the display mode of icons and the like on a road on which a branching point is provided.

A precondition for an icon string display in Example 8 is that at least one branching point is provided on a road along which a vehicle moves from its current position. This branching point is basically provided (unexpectedly) on a search route, independently of the search route or a route indicated by estimated route data. In this case, the branch point may become one of guide points, for example, on a newly found search route, as a result of searching for a new route in the future.

In the icon string display in Example 8, for example, (real) gas stations SD1 to SD6 are present along a (real) road R when viewed at the current position of the vehicle (actual current position) indicated by a current position mark PM, for example, as exemplified in FIG. 15(a). In addition, in Example 8, a (real) branching point C1 at which the vehicle can turn left is provided between the gas station SD2 and the gas station SD5; a (real) branching point C2 at which the vehicle can turn right is provided between the gas station SD3 and the gas station SD4.

According to one aspect exemplified in FIG. 15(b), in the case where the icon display process in Example 8 is performed under the above precondition, the display data generating unit 3 shows, on the display 6, a road mark RM, a current position mark PM, distance marks DL, and icons 80 to 85 that indicate the presence of the gas stations SD1 to SD6 corresponding to individual distances from the current position of the vehicle, as in Example 1 (see FIGS. 4(a) to 4(c)). In the icon string display in Example 8, the display data generating unit 3 further shows a branching point mark LMK at the inner position of an icon string display that indicates the position of the branching point C1 exemplified in FIG. 15(a); the branching point mark LMK indicates the presence of the branching point C1 at which a vehicle can turn left. Further, in the icon string display in Example 8, the display data generating unit 3 further shows a branching point mark RMK at the inner position of an icon string display that indicates the position of the branching point C2 exemplified in FIG. 15(a); the branching point mark RMK indicates the presence of the branching point C2 at which a vehicle can turn right. Furthermore, in addition, in the icon string display in Example 8, the display data generating unit 3 shows a quantity mark LL close to the branching point mark LMK; the quantity mark LL indicates the quantity of gas stations (i.e., the quantity of facilities falling into a current display target category in an icon string display) positioned within a predetermined distance from the branching point C1 with its presence indicated by the branching point mark LMK if a vehicle turns left at the branching point C1. Further likewise, the display data generating unit 3 shows a quantity mark LR close to the branching point mark RMK; the quantity mark LR indicates the quantity of gas stations positioned within a predetermined distance from the branching point C2 with its presence indicated by the branching point mark RMK if a vehicle turns right at the branching point C2. Data for use in showing the branching point marks RMK and LMK and the quantity marks LL and LR are stored in the storage unit 1 in advance, for example, as the branch road display data 1E exemplified in FIG. 2(b), and acquired and used for the icon string display in Example 8 (see Step S5 in FIG. 3). Further, for example, information contained in the map database MDB in advance can be used for the position information regarding the positions of the branching points C1 and C2 themselves and the quantity of gas stations positioned behind a branch. Herein, the word "quantity" may mean, for example, the quantity of gas stations positioned within a predetermined distance from the branching point C1 or C2 at each branch, or the quantity of gas stations positioned between the branching point C1 or C2 and a next branching point. Further, for example, these pieces of information can be configured to be acquired from such as an external server apparatus via the above network.

Figure 16A:
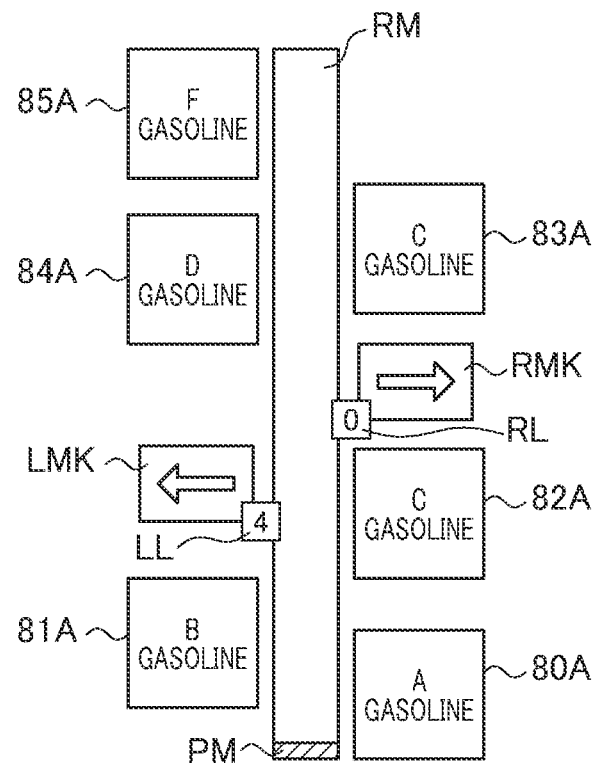
FIGS. 16(a) and 16(b) are exemplary icon displays (II) in Example 8.
Figure 16B:
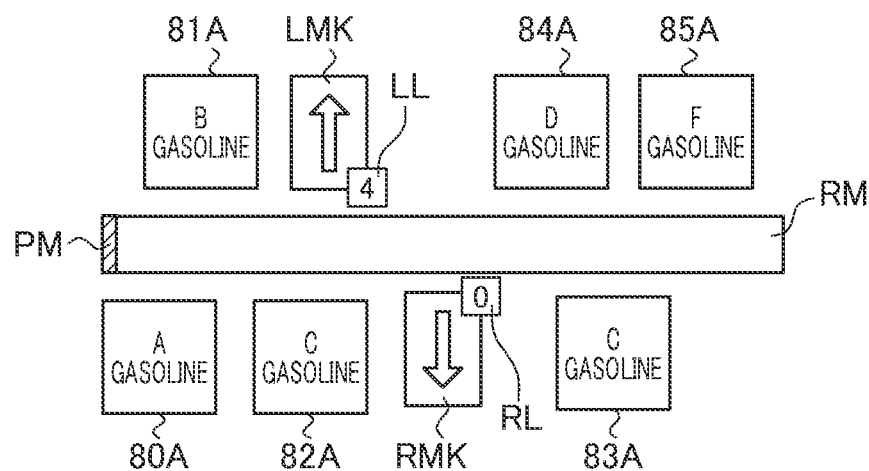

Further, in addition to the stereoscopic one exemplified in FIG. 15(a), the icon string display in Example 8 can be a planar one, for example, exemplified in FIG. 16(a) (vertical display) or FIG. 16(b) (lateral display), as in the icon string display in Example 1 described with FIG. 4(b) or 4(c). In these cases, icons 80A to 85A are shown on both sides (the right and left sides in the example of FIG. 16(a) or the upper and lower sides in the example of FIG. 16(b)) of a road mark RM with one end having a current position mark PM and at respective positions corresponding to the distances between the current position of the vehicle and the positions of facilities with their presence indicated by the icons 80A to 85A. In addition to this, the branching point marks LMK and RMK and the quantity marks LL and RL in Example 8 are shown at the position in FIG. 16(a) or 16(b) respectively. The meanings given by the branching point marks LMK and RMK and the quantity marks LL and RL are identical to those described with FIG. 15(b).

Figure 17A:
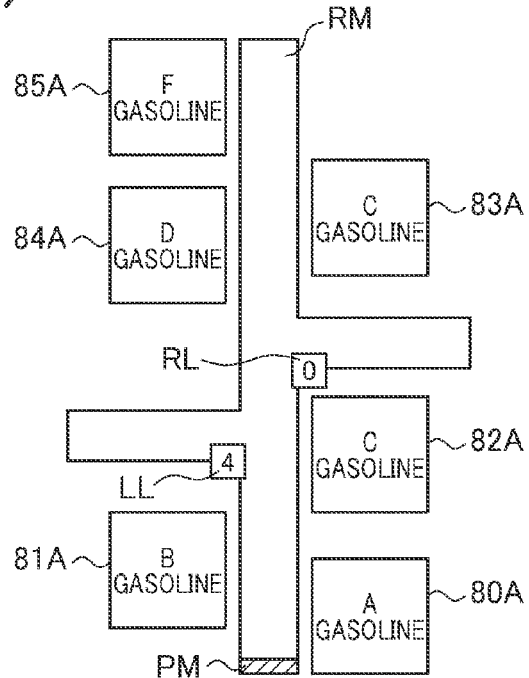
FIGS. 17(a) to 17(c) are exemplary icon displays (III) in Example 8.
Figure 17B:
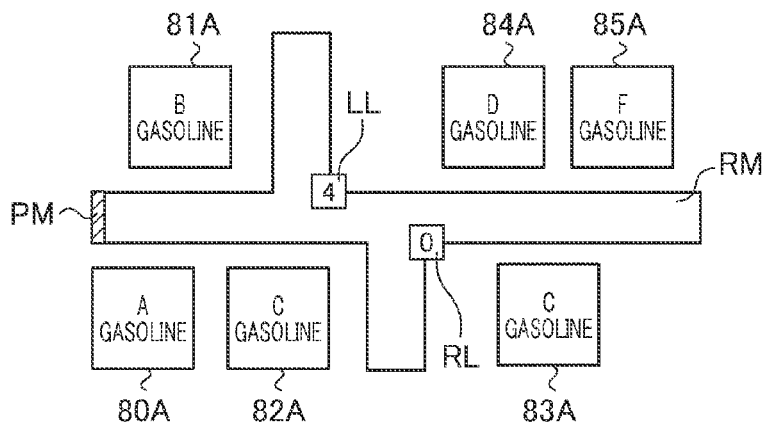

Further, each of the planar icon string displays described with FIGS. 16(a) and 16(b) can also be configured so that the display data generating unit 3 adds road marks RM that indicate roads branching off at branching point C1 and branching point C2 to a planar road mark RM, and shows only quantity mark LL and quantity mark RL at the positions of the road marks RM corresponding to the branching point C1 and the branching point C2, for example, as exemplified in FIG. 17(a) (vertical display) and FIG. 17(b) (lateral display). In this case, neither of the branching point mark LMK and the branching point mark RMK is shown.

Figure 17C:
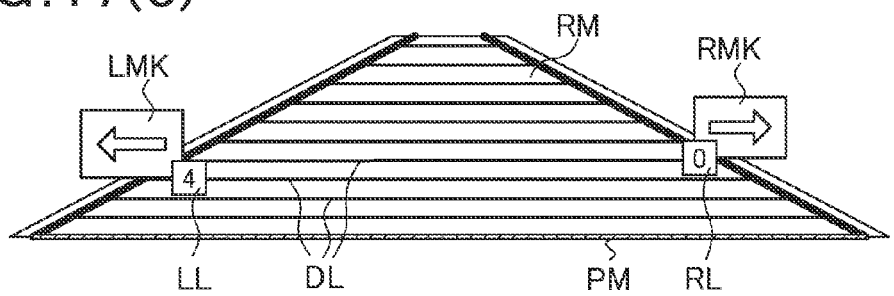

Furthermore, to give another example, as illustrated in FIG. 17(c), in the stereoscopic icon string display in Example 8, no facilities falling into a display target category are currently present on the remote side of the branching point C1 and the branching point C2 with their presence indicated by the branching point mark RMK and the branching point mark LMK, respectively. Then, facilities falling into this category are present on roads branching off at the branching point C1 and the branching point C2. Then the icon string display may be configured so that the respective quantities of these facilities are shown as the quantity mark RL and the quantity mark LL and, for example, if the branching point mark LMK indicates the presence of a larger quantity of those facilities, the display data generating unit 3 may encourage a user of the navigation system SS to change the route (turn left in the example of FIG. 17(c)), for example, by flashing the branching point mark LMK. This flashing display may be configured so that control data for use in flashing icons are stored in the storage unit 1 in advance, for example, as the display control data 1B exemplified in FIG. 2(b), and acquired and used for the icon string display in Example 8 (see Step S5 in FIG. 3), and then the display data generating unit 3 uses this control data to show the branching point mark LMK in a flashing fashion (see Step S11 in FIG. 3).

Figure 18A:
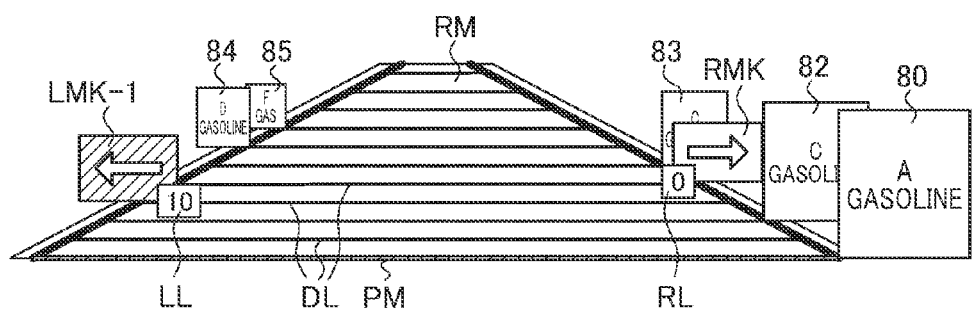
FIGS. 18(a) and 18(b) are exemplary icon displays (IV) in Example 8.
Figure 18B:
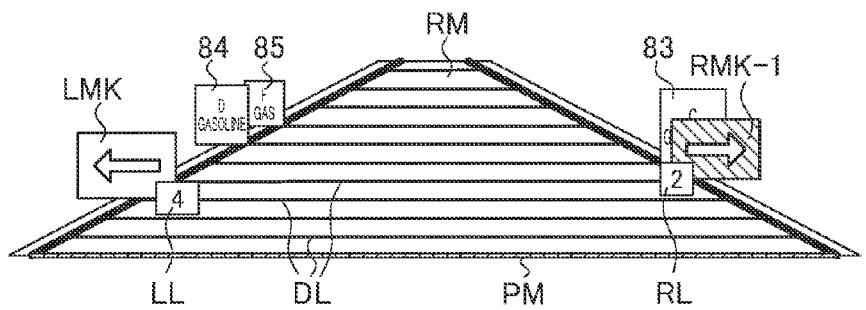

Further, to give another example, as illustrated in FIG. 18(a), in the stereoscopic icon string display in Example 8, in the case where a vehicle turns right at a branching point C1 with its presence indicated by a branching point mark RMK or turns left at a branching point C2 with its presence indicated by a branching point mark LMK, a larger quantity of facilities falling into a display target category appear than in the case where the vehicle moves straightly (in the example of FIG. 18(a), in the case where a vehicle turns left at the branching point C1 with its presence indicated by the branching point mark LMK, a larger quantity of gas stations of a display target will appear than in the case where the vehicle moves straightly). The icon string display may be configured so that the display data generating unit 3 encourages a user of the navigation system SS to change the route (turn left in the example of FIG. 18(*a*)), for example, by showing the branching point mark LMK in a flashing fashion like a branching point mark LMK-1 exemplified in FIG. 18(*a*). This flashing display may also be created by acquiring and using the control data for icon flash in accordance with the icon string display in Example 8.

Furthermore, to give still another example, as illustrated in FIG. 18(*b*), in the stereoscopic icon string display in Example 8, in the case of turning right at the branching point C1 with its presence indicated by the branching point mark RMK or turning left at the branching point C2 with its presence indicated by the branching point mark LMK, a vehicle can arrive at a facility falling into a display target category earlier than when moving straightly (in the example of FIG. 18(*b*), in the case of turning right at the branching point C2 with its presence indicated by the branching point mark RMK, a vehicle will arrive at a gas station of a display target earlier than when moving straightly). The icon string display may be configured so that the display data generating unit 3 encourages a user of the navigation system SS to change the route (turn right in the example of FIG. 18(*b*)), for example, by showing the branching point mark RMK in a flashing fashion like a branching point mark RMK-1 exemplified in FIG. 18(*b*). This flashing display may also be created by acquiring and using control the data for icon flash in accordance with the icon string display in Example 8.

Furthermore, in order to show the presence of a facility (not its quantity but the presence/absence of a facility on a branched road) after a right or left turn, the above quantity mark RL and quantity mark LL are not necessarily required. Alternatively, the branching point mark LMK and the like are shown in a display mode that enables the above presence or absence to be explicitly shown (e.g., showing a corresponding branching point mark LMK, etc. in a flashing or enlarged fashion).

As described above, according to the icon display process performed by the navigation system SS in Example 8, if a road branches off, a branching point mark LMK or the like is shown on the display 6 at a display position corresponding to this branching point, and a quantity mark LL or the like is shown at a display position corresponding to the branching point mark LMK or the like. This makes it possible to recognize intuitively and promptly the position of a branching point and whether or not a facility or the like is present behind the branching point. Consequently, in addition to the effect of the icon display process performed by the navigation system SS in Example 1, for example, the icon display process performed by the navigation system SS in Example 8 can prevent a vehicle from moving to a road on which no facilities falling into a display target category are present, and provide more intuitively and promptly a user with an advantageous route (i.e., a route on which there is a large selection of facilities).

Further, in the case where the branching point mark LMK or the like contains an arrow indicating a divergent direction, as exemplified in FIG. 15(*b*) and the like, the divergent direction can be recognized more intuitively and promptly.

Further, in the case where a road mark RM indicating a branch road shows a branch, as exemplified in FIGS. 17(*a*) to 17(*c*), the branch can be recognized more intuitively and promptly.

Furthermore, in the case where a quantity mark LL or the like that indicates the quantity of facilities positioned behind a branch is shown, as exemplified in FIGS. 15(*b*) to 18(*b*), the quantity of facilities positioned behind the branch can be recognized intuitively and promptly.

Further, in the case where the quantity mark LL or the like indicates the quantity of facilities and the like that are positioned behind a branch and fall into the same category as those indicated by the currently shown icons including such as the icon 80, the quantity of facilities and the like that are positioned behind a branch and fall into the same category can be recognized intuitively and promptly.

Further, as exemplified in FIG. 18(*a*), in the case where a larger quantity of facilities and the like appear if a vehicle moves to a branch road, a branching point mark LMK-1 that indicates a branch road on which a large quantity of facilities and the like are present is made greater in visibility than the icon 80 and another branching point mark RMK. This enables a user to recognize an advantageous branch road more intuitively and promptly.

Furthermore, in the case where no facilities and the like are present along a road positioned farther away from a branch than the current position of the vehicle, as exemplified in FIG. 17(*c*), a branching point mark LMK or the like indicating this branch is made greater in visibility than the icon 80 and another branching point mark RMK. This enables a user to recognize an advantageous branch road more intuitively 10 and promptly.

Further, in the case where a vehicle can arrive at a desired facility or the like earlier if moving to a branch road, as exemplified in FIG. 18(*b*), a branching point mark RMK that corresponds to the branch road 15 through which the vehicle can arrive at the facility or the like earlier is made greater in visibility than the icon 83 and another branching point mark LMK. This enables a user to recognize an advantageous branch road more intuitively and promptly.

Further, in Example 8 described above, the example based on the precondition that the icon string display is created has been described; however the present application is not limited to this example. Alternatively, the present application may not involve the creation of an icon string display, and include a configuration in which when a road on which a vehicle will move branches off, a branching point mark LMK or the like is shown on the display 6 at a display position corresponding to the position of the branching point, and a quantity mark LL or the like is shown at a display position corresponding to the branching point mark LMK or the like. Even in this case, it is possible to recognize intuitively and promptly the position of a branching point and whether or not a facility or the like is present ahead of this branching point. This makes it possible to prevent a vehicle from moving to a road on which no facilities falling into a display target category are present, and provide a user more intuitively and promptly with an advantageous route.

Further, in the examples described above, an icon formed of an image is used as an example of a "terrestrial object index" in the present application; however an index formed of text or sign data except image data is also applicable to the present application, instead of the icon in each example.

Figure 19:
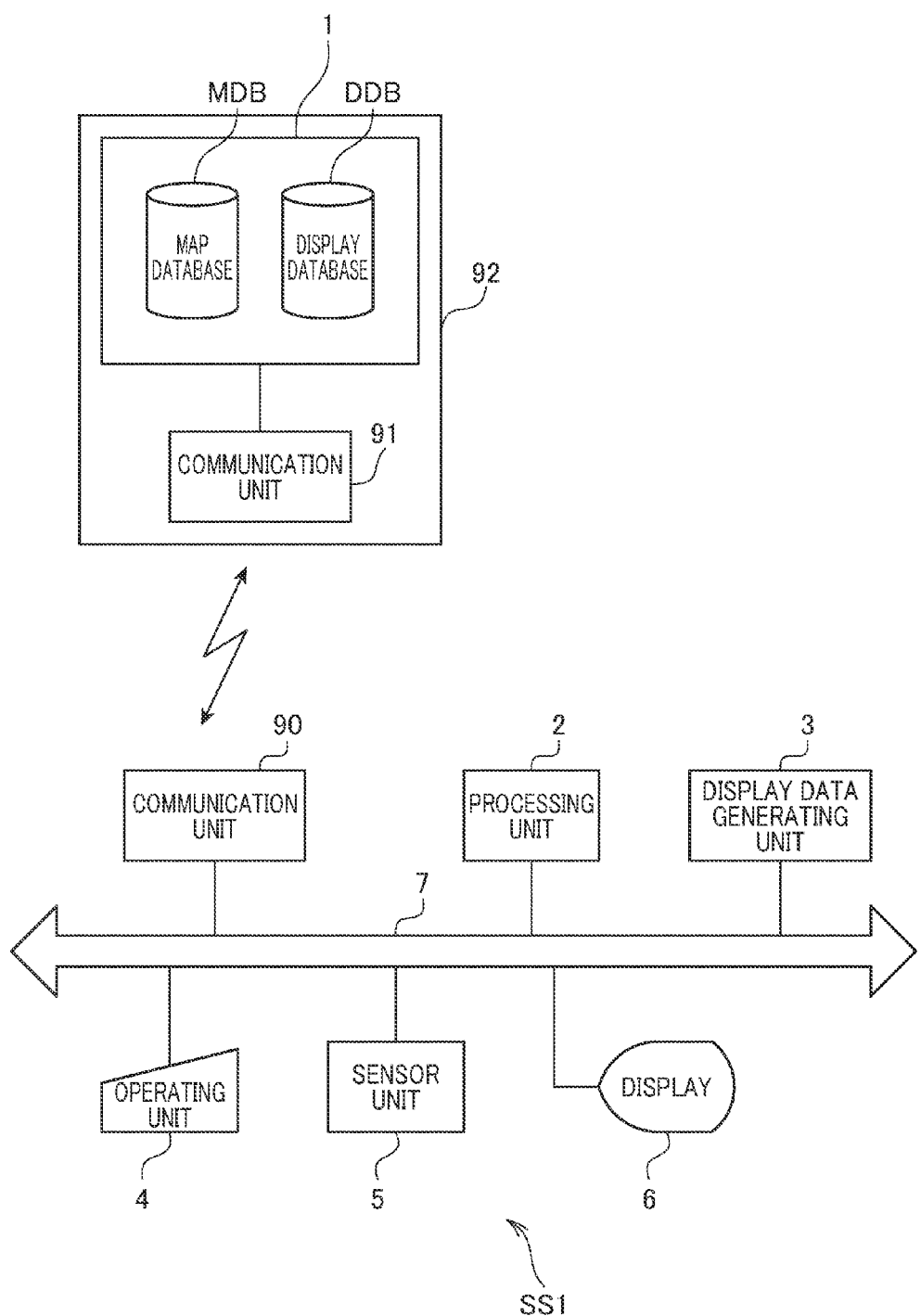

Further, the examples described above are configured so that the navigation system SS exemplified in FIGS. 2(*a*) to 2(*c*) completes the icon string display in the examples and then executes it. Alternatively, a configuration can also be employed, in which the storage unit 1 in each example is installed in a server apparatus 92 on a network, for example, as exemplified in FIG. 19. Then, the icon string display in each example is created, via the network, through data transmission or reception between the communicating unit 91 provided in the server apparatus 92 and the communicating unit 90 provided in the navigation system SS1, respectively. In this case, by reducing greatly the storage capacity required for the navigation system SS1, for example, the navigation system SS itself can be manufactured at a low cost and sold at a low price.

Further, the examples have been described, regarding the case where the present application is applied to the navigation system SS or the navigation system SS1. However, for example, the present application is also applicable to a case where the icon string display in each example is created on the display of an information terminal that a user has on a vehicle. In this case, both the processing unit 2 and the display data generating unit 3 in each example do not necessarily have to be provided inside this information terminal. Alternatively, for example, the processing unit 2 and the display data generating unit 3 may be provided inside a server apparatus connected to the information terminal via a network. It is then necessary to transmit display data and the like generated in the display data generating unit 3 to the information terminal over the network, and create the icon string display in each example in the information terminal.

Furthermore, the functions of the processing unit 2 and the display data generating unit 3 in the navigation system SS or the navigation system SS1 in each example described above may be functionally implemented in the CPU in the processing unit 2 and the display data generating unit 3, for example, by causing the CPU in the processing unit 2 and the display data generating unit 3 to read and execute a program according to the flowchart of FIG. 3. This program may be configured to be acquired and executed by the navigation system SS or the navigation system SS1 over a network NW. Alternatively, the program can be configured to be read from an optical disc or some other recording medium and executed by the processing unit 2 and the display 10 data generating unit 3 in each apparatus.

REFERENCE SIGNS LIST

1 storage unit
2 processing unit
2A position information acquiring means
2B distance information acquiring means
2C transmitting means
3 display data generating unit (generating means)
4 operating unit
5 sensor unit
6 display
1A icon display data
1B display control data
1C associated information display data
1D road-and-others display data
1E branch road display data
10, 11, 12, 13, 14, 15, 16, 17, 18, 19 icon
S display information generating device
SS, SS1 navigation system
DDB display database
RM road mark
PM current position mark
DL distance mark

The invention claimed is:

1. A display information generating apparatus that generates display information to be shown in a display means, the display means moving together with a movable body, the display information generating apparatus comprising:
    a position information acquiring means that acquires position information indicating a position of the movable body;
    a distance information acquiring means that acquires distance information indicating distances between the position of the movable body and respective terrestrial objects, on the basis of the acquired position information, the terrestrial objects being positioned along a moving path on which the movable body is movable; and
    a generating means that generates the display information on the basis of the acquired position information and the acquired distance information, the display information being used for showing terrestrial object indices in the display means along a path mark indicating the moving path, the terrestrial object indices indicating the terrestrial objects on both sides of the moving path, the terrestrial object indices being arranged in the order in which the terrestrial object indices appear along with the movement of the movable body,
    wherein the generating means generates the display information being used for showing the path mark in the display means to express the moving path extending in the depth direction of the display means,
    in a case where the terrestrial objects exist on the left side of the moving path, the generating means generates the display information being used for showing the terrestrial object indices indicating the terrestrial objects existing on the left side of the moving path on only the left side of the path mark, and
    in a case where the terrestrial objects exist on the right side of the moving path, the generating means generates the display information being used for showing the terrestrial object indices indicating the terrestrial objects existing on the right side of the moving path on only the right side of the path mark.

2. The display information generating apparatus according to claim 1, wherein
    the generating means generates the display information on the basis of the acquired distance information, the display information being used for showing the terrestrial object indices and relation indices in the display means in a case where a plurality of the terrestrial objects is present at a same-distance-position respectively, the same-distance-position being the positions at which each of the distances from the movable body is the same, the terrestrial object indices indicating the plurality of the terrestrial objects being able to be discriminated from one another, the relation indices indicating the relative positioning of the plurality of the terrestrial objects on the same-distance-position for the same-distance-position.

3. The display information generating apparatus according to claim 1, wherein,
    in a case where at least a part of each of the terrestrial object indices overlap one another in the display means, the generating means generates the display information being used for showing such that the display positions of the terrestrial object indices, each of which has visibility reduced by the overlap, are changed between the overlapping first position in the display means and the overlapping second position in the display means different from the overlapping first position.

4. The display information generating apparatus according to claim 1, wherein,
    in a case where at least a part of the terrestrial object indices overlap one another in the display means, the generating means generates the display information being used for showing such that the terrestrial object indices, each of which has visibility reduced by the overlap, are shown in an enlarged fashion in the display means.

5. The display information generating apparatus according to claim 1, wherein,
in the case where at least a part of each of the terrestrial object indices overlap one another in the display means, the generating means generates the display information being used for showing an associated index indicating the presence of each of the terrestrial objects, each of which is indicated by the terrestrial object index of which the visibility is by the overlap.

6. The display information generating apparatus according to claim 1, wherein
the generating means generates the display information being used for showing a plurality of common-attribute terrestrial object indices such that the common-attribute terrestrial object indices each indicating the common-attribute terrestrial object out of the common-attribute terrestrial object positioned closest to the position of the movable body in the moving of the movable body are lower in visibility than the common-attribute terrestrial object index indicating the common-attribute terrestrial object positioned closest to the position of the movable body indicated by the acquired position information, a plurality of the common-attribute terrestrial objects having the same attribute as each other.

7. The display information generating apparatus according to claim 1, wherein,
in a case where the terrestrial object index displayed in the display means is selected, the generating means generates the display information being used for showing a selection index indicating to be above selected on a display position according to the display position of the selected terrestrial object index, and
wherein, in a case where the terrestrial object index, out of the terrestrial object indices, indicating the terrestrial object positioned closest to the position of the movable body indicated by the acquired position information among the displayed terrestrial object indices, is selected, the generating means generates the display information such that the position index indicating the position of the movable body is hidden in the display means.

8. The display information generating apparatus according to claim 1,
wherein, in a case where the terrestrial object index displayed in the display means is selected, the generating means generates the display information being used for showing a selection index indicating to be above selected on a display position according to the display position of the selected terrestrial object index, and
wherein, in a case where the terrestrial object index, out of the terrestrial object indices, indicating the terrestrial object positioned closest to the position of the movable body indicated by the acquired position information among the displayed terrestrial object indices, is selected, the generating means generates the display information such that the selected terrestrial object index is displayed on the display position of the display means corresponding to the position closest to the position of the movable body.

9. The display information generating apparatus according to claim 1, wherein,
in a case where the terrestrial object index displayed in the display means is selected, the generating means generates the display information being used for showing a selection index indicating to be above selected on a display position according to the display position of the selected terrestrial object index, and
wherein the generating means generates the display information such that the terrestrial object indices each indicating the other terrestrial objects are lower in visibility than the selected terrestrial object index, the other terrestrial objects being positioned at positions at least a preset distance or a preset moving time away from the position of the terrestrial object indicated by the selected terrestrial object index.

10. The display information generating apparatus according to claim 1, wherein,
in a case where the terrestrial object index displayed in the display means is selected, the generating means generates the display information being used for showing a selection index indicating to be above selected on a display position according to the display position of the selected terrestrial object index, and
wherein, in a case where a plurality of the terrestrial object indices respectively indicating a plurality of the terrestrial objects are sequentially selected, the generating means generates the display information being used for switching the selection of each of the terrestrial object indices each indicating each of the terrestrial objects in order according to a necessary moving distance over which the movable body moves to each of the terrestrial objects.

11. The display information generating apparatus according to claim 1,
wherein, in a case where a branching point is provided on the moving path, the generating means generates (i) the display information being used for showing a branch index indicating the branching point on a position of the display means corresponding to the position of the branching point, and generates (ii) the display information being used for showing a presence or absence index at least indicating the presence or absence of the terrestrial objects behind the branching point on the display position according to the display position of the branch index, and
wherein, in a case where a larger quantity of terrestrial objects appear when the movable body moves along a branch moving path positioned within a predetermined distance from the branching point, the generating means generates the display information being used for showing the branch index on the display, the branch index indicating the branch moving path on which the larger quantity of terrestrial objects are present, being made greater in visibility than the terrestrial object indices and other branch indices.

12. The display information generating apparatus according to claim 1, wherein,
in a case where when a branching point is provided on the moving path, the generating means generates (i) the display information being used for showing a branch index indicating the branching point on a position of the display means corresponding to the position of the branching point, and generates (ii) the display information being used for showing a presence or absence index at least indicating presence or absence of the terrestrial objects behind the branching point on the display position according to the display position of the branch index, and wherein, in the case where no terrestrial objects are present within a predetermined distance along the moving path positioned farther away from the branching point than the position of the movable body indicated by the acquired position information, the generating means generates the display information being used for showing, on the display means, the branch index indicating the branching point being made greater in visibility than the terrestrial object indices and other branch indices.

13. The display information generating apparatus according to claim 1, wherein,
in a case where a branching point is provided on the moving path, the generating means generates (i) the display information being used for showing a branch index indicating the branching point on a position of the display means corresponding to the position of the branching point, and generates (ii) the display information being used for showing a presence or absence index at least indicating the presence or absence of the terrestrial objects behind the branching point on the display position according to the display position of the branch index, and
wherein, in a case where the movable body is able to arrive at a terrestrial object earlier when moving to a branch moving path than moving to the moving path on which the movable body moving, the generating means generates the display information being used for showing, on the display means, the branch index corresponding to the branch moving path through which the movable body is able to arrive at the terrestrial object earlier being made greater in visibility than the terrestrial object indices and other branch indices.

14. A non-transitory information recording medium storing the display information generating program, the display information generating program causing a computer included in the display information generating apparatus according to claim 1 to function as:
the position information acquiring means, the distance information acquiring means, and the generating means.

15. The display information generating apparatus according to claim 1, wherein,
the generating means generates the display information being used for showing each of the terrestrial object indices such that, on the basis of each of the acquired distance information for each of the terrestrial objects, the size of each of the terrestrial object indices in the display means is as small as the distance indicated by each of the acquired distance information for each of the terrestrial objects respectively indicated by each of the terrestrial object indices is far.

16. The display information generating apparatus according to claim 2, wherein,
the generating means generates the display information being used for showing each of the terrestrial object indices such that, on the basis of each of the acquired distance information for each of the terrestrial objects, the size of each of the terrestrial object indices in the display means is as small as the distance indicated by each of the acquired distance information for each of the terrestrial objects respectively indicated by each of the terrestrial object indices is far.

17. The display information generating apparatus according to claim 3, wherein,
the generating means generates the display information being used for showing each of the terrestrial object indices such that, on the basis of each of the acquired distance information for each of the terrestrial objects, the size of each of the terrestrial object indices in the display means is as small as the distance indicated by each of the acquired distance information for each of the terrestrial objects respectively indicated by each of the terrestrial object indices is far.

18. The display information generating apparatus according to claim 4, wherein,
the generating means generates the display information being used for showing each of the terrestrial object indices such that, on the basis of each of the acquired distance information for each of the terrestrial objects, the size of each of the terrestrial object indices in the display means is as small as the distance indicated by each of the acquired distance information for each of the terrestrial objects respectively indicated by each of the terrestrial object indices is far.

19. The display information generating apparatus according to claim 5, wherein,
the generating means generates the display information being used for showing each of the terrestrial object indices such that, on the basis of each of the acquired distance information for each of the terrestrial objects, the size of each of the terrestrial object indices in the display means is as small as the distance indicated by each of the acquired distance information for each of the terrestrial objects respectively indicated by each of the terrestrial object indices is far.

20. A display information generating method performed by a display information generating apparatus, the display information generating apparatus generating display information to be shown in a display means, the display means moving together with a movable body, the display information generating method comprising:
acquiring position information indicating a position of the movable body;
acquiring distance information indicating distances between the position of the movable body and respective terrestrial objects, on the basis of the acquired position information, the terrestrial objects being positioned along a moving path on which the movable body is movable; and
generating the display information on the basis of the acquired position information and the acquired distance information, the display information being used for showing terrestrial object indices in the display means along a path mark indicating the moving path, the terrestrial object indices indicating the terrestrial objects on both sides of the moving path, the terrestrial object indices being arranged in the order in which the terrestrial object indices appear along with the movement of the movable body,
wherein in the generating, the display information is generated to show the path mark in the display means to express the moving path extending in the depth direction of the display means,
in a case where the terrestrial objects exist on the left side of the moving path, in the generating, the display information is generated to be used for showing the terrestrial object indices indicating the terrestrial objects existing on the left side of the moving path only the left side of the path mark, and
in a case where the terrestrial objects exist on the right side of the moving path, in the generating, the display information is generated to be used for showing the terrestrial object indices indicating the terrestrial objects existing on the right side of the moving path on only the right side of the path mark.

* * * * *